US012584022B2

(12) United States Patent (10) Patent No.: US 12,584,022 B2
Grüner et al. (45) Date of Patent: Mar. 24, 2026

(54) SOLVOCHROMIC EFFECT PIGMENTS, METHOD OF PRODUCTION AND USE THEREOF

(71) Applicant: ECKART GMBH, Hartenstein (DE)

(72) Inventors: Michael Grüner, Auerbach (DE); Günter Kaupp, Neuhaus (DE); Miriam Malz, Erbendorf (DE)

(73) Assignee: ECKART GmbH (DE)

( * ) Notice: Subject to any disclaimer, the term of this patent is extended or adjusted under 35 U.S.C. 154(b) by 496 days.

(21) Appl. No.: 18/016,600

(22) PCT Filed: Jul. 22, 2021

(86) PCT No.: PCT/EP2021/070544
§ 371 (c)(1),
(2) Date: Jan. 17, 2023

(87) PCT Pub. No.: WO2022/018208
PCT Pub. Date: Jan. 27, 2022

(65) Prior Publication Data
US 2023/0295443 A1 Sep. 21, 2023

(30) Foreign Application Priority Data
Jul. 23, 2020 (EP) ..................................... 20187430

(51) Int. Cl.
*C09C 3/06* (2006.01)
*C09C 3/00* (2006.01)
*C09C 3/04* (2006.01)

(52) U.S. Cl.
CPC .............. *C09C 3/063* (2013.01); *C09C 3/006* (2013.01); *C09C 3/043* (2013.01);
(Continued)

(58) Field of Classification Search
CPC ................................ C09C 3/063; C09C 3/006
See application file for complete search history.

(56) References Cited

U.S. PATENT DOCUMENTS 3,087,828 A 4/1963 Linton
4,086,100 A 4/1978 Esselborn
(Continued)

FOREIGN PATENT DOCUMENTS

CA 2180669 1/1997
CN 1243797 2/2000
(Continued)

OTHER PUBLICATIONS

International Search Report and Written Opinion for International Application No. PCT/EP2021/070544 dated Nov. 26, 2021.
(Continued)

*Primary Examiner* — Pegah Parvini

(57) ABSTRACT

The present invention is directed to effect pigments with solvochromic properties. These effect pigments have a structure comprising a substrate in platelet form and a coating applied to the substrate, wherein the coating comprises: optionally a layer (1) comprising or consisting of at least one of tin oxide, tin hydroxide and/or tin oxide hydrate, a layer (2) comprising at least one of metal oxide, metal hydroxide and/or metal oxide hydrate, and a layer (3) comprising at least one of metal oxide, metal hydroxide and/or metal oxide hydrate, wherein the layers (2) and (3) comprise in their metal oxide, metal hydroxide and/or metal oxide hydrate in a majority two different metal ions from the group consisting of Ti, Fe, Sn or Zr and a further spacer layer (4) being located in between layers (2) and (3), wherein layer (4) has a porous structure comprising cavities and connectors. The solvochromic properties denote to the effect pigment having a first interference color under ambient atmosphere which changes reversibly to a second interference color, when the effect pigment comes into contact with a solvent.

18 Claims, 6 Drawing Sheets

100 nm*

Figure 1:
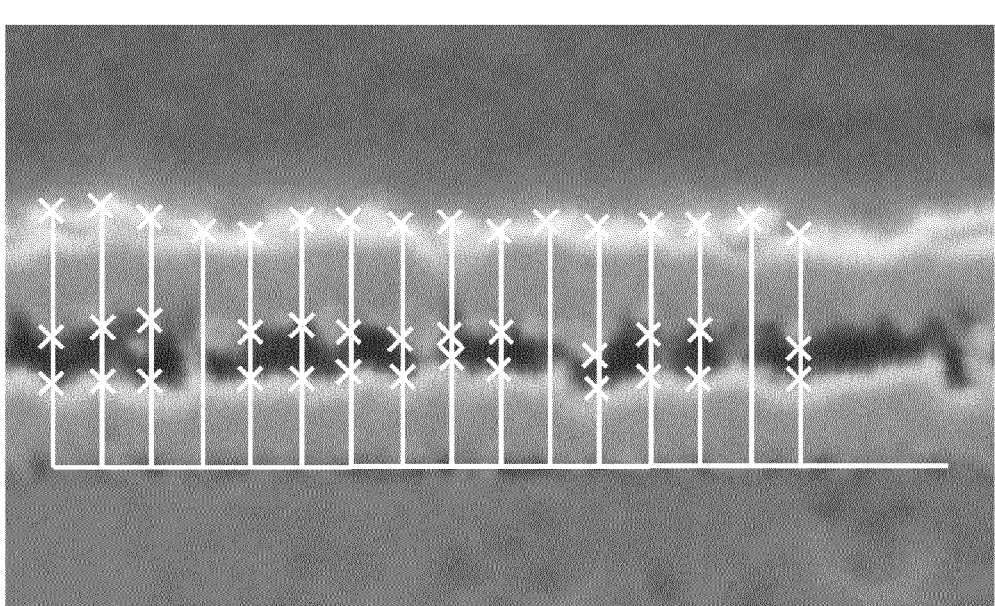

(52) U.S. Cl.
CPC ............... *C09C 2200/1004* (2013.01); *C09C 2200/401* (2013.01); *C09C 2220/106* (2013.01)

(56) References Cited

U.S. PATENT DOCUMENTS

| | | | |
|---|---|---|---|
| 4,744,832 | A | 5/1988 | Franz |
| 5,273,576 | A | 12/1993 | Sullivan |
| 5,302,199 | A | 4/1994 | Prengel |
| 5,624,486 | A | 4/1997 | Schmid |
| 5,753,317 | A | 5/1998 | Law |
| 5,753,371 | A | 5/1998 | Sullivan |
| 5,958,125 | A | 9/1999 | Schmid |
| 6,000,804 | A | 12/1999 | Kimura |
| 6,129,784 | A | 10/2000 | Ikuta |
| 6,290,766 | B1 | 9/2001 | Deluca, Jr. |
| 6,485,556 | B1 | 11/2002 | DeLuca, Jr. |
| 6,569,529 | B1 | 5/2003 | Phillips |
| 6,596,070 | B1 | 7/2003 | Schmidt |
| 6,599,355 | B1 | 7/2003 | Schmidt |
| 6,648,957 | B1 | 11/2003 | Andes |
| 6,692,561 | B1 | 2/2004 | Schoen |
| 6,777,085 | B1 | 8/2004 | Argoitia |
| 6,794,037 | B2 | 9/2004 | Zimmermann |
| 7,993,443 | B2 | 8/2011 | Fuller |
| 7,993,444 | B2 | 8/2011 | Fuller |
| 8,383,532 | B2 | 2/2013 | Fujiwara |
| 8,585,818 | B1 | 11/2013 | Jones |
| 10,391,043 | B2 | 8/2019 | Grüner et al. |
| 10,759,941 | B2 | 9/2020 | Grüner et al. |
| 10,934,436 | B2 | 3/2021 | Grüner et al. |
| 10,947,391 | B2 | 3/2021 | Grüner et al. |
| 11,202,739 | B2 | 12/2021 | Grüner et al. |
| 2003/0209169 | A1 | 11/2003 | Andes |
| 2004/0003758 | A1 | 1/2004 | Bruckner |
| 2004/0139889 | A1 | 7/2004 | Zimmermann |
| 2006/0042509 | A1 | 3/2006 | Henglein |
| 2008/0181921 | A1 | 7/2008 | DeLuca |
| 2009/0252772 | A1 | 10/2009 | Henglein |
| 2009/0264575 | A1 | 10/2009 | Henglein |
| 2010/0011992 | A1 | 1/2010 | Bujard |
| 2010/0297045 | A1 | 11/2010 | Kaupp |
| 2010/0322981 | A1 | 12/2010 | Bujard |
| 2011/0160389 | A1 | 6/2011 | Bubat |
| 2011/0226161 | A1 | 9/2011 | Schumacher |
| 2011/0251293 | A1 | 10/2011 | Trummer |
| 2011/0259243 | A1 | 10/2011 | Schumacher |
| 2011/0265689 | A1 | 11/2011 | Schumacher |
| 2011/0265690 | A1 | 11/2011 | Schumacher |
| 2011/0306678 | A1 | 12/2011 | Liu |
| 2013/0164356 | A1 | 6/2013 | Pfaff |
| 2013/0216597 | A1 | 8/2013 | Mathias |
| 2014/0165878 | A1 | 6/2014 | Chang |
| 2014/0251184 | A1 | 9/2014 | Mcguire |
| 2015/0344677 | A1 | 12/2015 | Jones |
| 2017/0348201 | A1 | 12/2017 | Grüner |
| 2017/0348202 | A1* | 12/2017 | Grüner .................... A61Q 3/02 |
| 2018/0155550 | A1 | 6/2018 | Grüner |

FOREIGN PATENT DOCUMENTS

| | | |
|---|---|---|
| CN | 101289580 | 10/2008 |
| CN | 102718229 | 10/2012 |
| DE | 1959998 | 7/1971 |
| DE | 2522527 | 12/1975 |
| DE | 19836810 | 2/2000 |
| DE | 102011012214 | 8/2012 |
| DK | 1153088 | 9/2004 |
| EP | 0289240 | 11/1988 |
| EP | 0668329 | 8/1995 |
| EP | 0708154 | 4/1996 |
| EP | 0723997 | 7/1996 |
| EP | 0870730 | 10/1998 |
| EP | 0948572 | 10/1999 |
| EP | 0950693 | 10/1999 |
| EP | 1029900 | 8/2000 |
| EP | 1213330 | 6/2002 |
| EP | 1251152 | 10/2002 |
| EP | 1270682 | 1/2003 |
| EP | 1281732 | 2/2003 |
| EP | 1306412 | 5/2003 |
| EP | 1375601 | 1/2004 |
| EP | 1422268 | 5/2004 |
| EP | 1553144 | 7/2005 |
| EP | 1621585 | 2/2006 |
| EP | 1685198 | 8/2006 |
| EP | 1829833 | 9/2007 |
| EP | 1980594 | 10/2008 |
| EP | 2371908 | 10/2011 |
| EP | 2508571 | 10/2012 |
| EP | 2691478 | 2/2014 |
| EP | 2698403 | 2/2014 |
| EP | 2832801 | 2/2015 |
| EP | 2904052 | 8/2015 |
| EP | 2905320 | 8/2015 |
| EP | 3034563 | 6/2016 |
| EP | 3034564 | 6/2016 |
| EP | 3034566 | 6/2016 |
| EP | 3234024 | 10/2017 |
| EP | 3234025 | 10/2017 |
| EP | 3395763 | 10/2018 |
| ES | 2426462 | 10/2013 |
| JP | S49128027 | 12/1974 |
| JP | S51143027 | 12/1976 |
| JP | S5869258 | 4/1983 |
| JP | S6234962 | 2/1987 |
| JP | H05279594 | 10/1993 |
| JP | H08259840 | 10/1996 |
| JP | H08302236 | 11/1996 |
| JP | H10101377 | 4/1998 |
| JP | H10316882 | 12/1998 |
| JP | H11139734 | 7/1999 |
| JP | H11217516 | 8/1999 |
| JP | 2000081832 | 3/2000 |
| JP | 2001520296 | 10/2001 |
| JP | 2005515769 | 6/2005 |
| JP | 2005307155 | 11/2005 |
| JP | 2006160683 | 6/2006 |
| JP | 2008230997 | 10/2008 |
| JP | 5475210 | 4/2014 |
| KR | 101135360 | 4/2012 |
| KR | 102049310 | 11/2019 |
| WO | 9638505 | 12/1996 |
| WO | 1996038505 | 12/1996 |
| WO | 1997046624 | 12/1997 |
| WO | 2000021905 | 4/2000 |
| WO | 2003006558 | 1/2003 |
| WO | 2004031102 | 4/2004 |
| WO | 2004055119 | 7/2004 |
| WO | 2004087816 | 10/2004 |
| WO | 2006021386 | 3/2006 |
| WO | 2006136435 | 12/2006 |
| WO | 2007115675 | 10/2007 |
| WO | 2008077612 | 7/2008 |
| WO | 2009144005 | 12/2009 |
| WO | 2011147892 | 12/2011 |
| WO | 2012078351 | 6/2012 |
| WO | 2012130897 | 10/2012 |
| WO | 2014053454 | 4/2014 |
| WO | 2014094993 | 6/2014 |
| WO | 2015017722 | 2/2015 |
| WO | 2015183674 | 12/2015 |

OTHER PUBLICATIONS

U.S. Appl. No. 62/004,007, filed May 28, 2014.

* cited by examiner 100 nm 100 nm

SOLVOCHROMIC EFFECT PIGMENTS, METHOD OF PRODUCTION AND USE THEREOF

The present invention relates to effect pigments having interference colors which exhibit solvochromic properties. The invention also relates to a method of producing such solvochromic effect pigments.

The solvochromic effect is well known for molecules. It is associated with a change of the optical appearance when dissolving a molecule in a certain solvent. It is originated in a change of energy levels of the molecule due to interactions with the solvent molecules.

This effect is well known for dyes which are within their definition dissolved in the surrounding media. Pigments are dispersed in the media and conventional color pigments also may have certain solvochromic effects. These dyes or pigments do not exhibit any interference colors.

WO 2012/078351 A2 discloses porous photonic structures based on inverse opals where at least two different regions in this structure have different properties with respect to e.g. hydrophobicity/hydrophility. Such structures can be used in diagnostics, security, encryption and document authentication. However, these structures are too large to be handled as pigments. Especially these structures are too large in all three dimensions. WO 2015/017722 A2 discloses similar photonic structures where part of the structure has been treated with colored pigments. Furthermore, these pigments may cause problems with respect to product regulations as they involve nano particles. These structures are complicated in production and especially to apply and have not yet commercially been available in a noticeable scale.

In EP 2905320 A1 a laminate is disclosed which changes it's color from dry state to a wetting state with water. The laminate is based on a first layer having metallic properties and thereon a printed porous layer comprising pearlescent pigments or cholesteric liquid-crystal pigments. However, the single effect pigments are not solvochromic and a particular structure of the whole coating stack is needed to achieve the effects of color change.

A new class of pearlescent effect pigments have been disclosed in EP 3034562 A1, EP 3034563 A1, and EP 3034564 A1 and WO 2016/097421 A1.

Likewise, interference pigments based on metallic substrates have been disclosed in EP 3034566 A1.

In these effect pigments a structure of at least two high-refractive coatings is interrupted by a so-called porous "spacer layer". This spacer layer is composed to a large quantity of air, but also involves some connectors. This particular coating structure is formed by diffusion of metal ions of adjacent layers during the calcination step.

Also, WO 2015/183674 A1 discloses multilayered effect pigments where diffusion process of metal ions between adjacent layers occur. However, this document did not disclose the particular "spacer layer" structure of the foregoing documents.

No solvochromic properties have been observed so far from these effect pigments.

It is an object of the present invention to provide an effect pigment which shows a solvochromic effect even in a single coating not depending on a complicated coating stack. It should be easily handled and provide stabilities with respect to mechanical impact or possibly weather stability. The effect pigment should show an interference color and exhibit high chroma and gloss in its applications.

Furthermore, it is an object of the present invention to provide a process of manufacturing such solvochromic effect pigment which is easy to handle and is capable also to be implemented to a large-scale production.

The object of the invention was solved by providing an effect pigment having solvochromic properties comprising a substrate in platelet form and a coating applied to the substrate, wherein the coating comprises a) optionally a layer 1 comprising or consisting of at least one of tin oxide, tin hydroxide and/or tin oxide hydrate, b) a layer 2 comprising at least one of metal oxide, metal hydroxide and/or metal oxide hydrate, and c) a layer 3 comprising at least one of metal oxide, metal hydroxide and/or metal oxide hydrate, wherein the layers 2 and 3 comprise in their metal oxide, metal hydroxide and/or metal oxide hydrate in a majority two different metal ions from the group consisting of Ti, Fe or Zr and d) a further spacer layer 4 being located in between layers 2 and 3, wherein layer 4 has a porous structure comprising cavities and connectors Preferred embodiments for these solvochromic effect pigments are disclosed in claims 2 to 9.

The object was further solved by providing a method for manufacturing these solvochromic effect pigments comprising the following steps:

(i) optionally applying an uncalcined layer comprising or consisting of at least one of tin oxide, tin hydroxide and/or tin oxide hydrate to the nonmetallic substrate in platelet form, (ii) sequentially applying three uncalcined layers A, B and C each consisting essentially of a single metal oxide, metal hydroxide and/or metal oxide hydrate, where the layers A, B and C are arranged directly one on top of another and wherein the metal ions of layers A, B and C are from the group consisting of Ti, Fe and Zr, wherein the metal ion from layer B is different to the metal ions of layers A or C, (iii) separating the effect pigments obtained in step (iii) from the liquid phase and drying the product, (iv) calcining the dried effect pigments obtained from step (iii) at a temperature in a range of 300° C. to 600° C., wherein the metal ions present in layer B diffuse at least partly into layer A and/or layer C during the calcination step to form the at least one layer 4.

Preferred embodiments for this method are disclosed in claims 11 to 14.

The object was further solved by the use of the solvochromic effect pigments in single coated cosmetic applications, in powder coating or in one-coat coating applications.

The object was further solved by providing an article comprising the effect pigments with solvochromic properties.

"Solvochromic properties" means within this invention, when an effect pigment having the structure of claim 1 and having a first interference color under ambient atmosphere which changes reversibly to a second interference color, when the effect pigment comes into contact with a solvent. This change of the interference color is reversible in the sense that the first interference color is retrieved, when the contact of effect pigment and solvent has been disabled again, e.g. by evaporation of the solvent. The solvent can be water or any other solvent or mixtures of solvents. This can be especially observed when the effect pigment is applied in a single coating. When a solvent like water or any other solvent or mixtures of solvents is applied on this coating the interference color changes markedly. After some time, when the solvent evaporates, the interference color changes repeatedly back to the original color. This procedure must be reversible for at least 10 times, preferably at least 25 times and more preferably at least 50 times.

With the term that the change of the interference colors is changed reversibly, it is meant in this invention, that the effect pigment is applied to a one coat application such as a draw-down as described under IIb) of the experimental part, and using a BYK-mac multi-angle colorimeter a first color measurement is done. When the surface is wetted and the solvent evaporates completely, i.e. no further color changes are visible, a second color measurement is made. Then the interference color is retained reversibly if at the 15° angle the $\Delta E^*_{15}{}^\circ = E^*_{15°,1st\ measurement} - E^*_{15°,2nd\ measurement}$ is $\leq 2.5$, preferably $\Delta E^*_{15°} \leq 2.0$, more preferably $\Delta E^*_{15°} \leq 1.0$ and more preferably $\Delta E^*_{15°} \leq 0.5$.

In case of a transparent pigment substrate this change of the interference color is accompanied by a corresponding change of the transmitted color.

This effect can well be observed visually, but may be difficult to be quantified as usually sprinkled surfaces are hardly accessible to exact color measurements.

Therefore, to quantify the solvochromic effect at least for a single sprinkling event of the effect pigments with solvent the procedure as described in section IIb of the experimental part is used. The quantity $\Delta H^*_{15}{}^\circ$ as measured on draw-downs described in section IIb must have a magnitude of at least $>5$, preferably $>9$ and most preferably $>12$. To avoid any misunderstandings here the absolute value of $\Delta H^*_{15}{}^\circ$ is meant.

The solvent can be principally chosen from a wide range. It can be water of miscible water/solvent mixtures like water-alcohol mixtures. In practice the solvent will be chosen from a solvent which is compatible with the coating system into which the effect pigments are applied on a substrate.

In this invention the term "effect pigments with solvochromic properties" can be equally used as "solvochromic effect pigments".

Solvochromic Effect Pigment Substrates:

The substrate in platelet form for the solvochromic effect pigments is preferably selected from the group consisting of metal platelets and nonmetallic platelet substrates such as natural mica platelets, synthetic mica platelets, iron mica, glass platelets, $SiO_2$ platelets, $Al_2O_3$ platelets, kaolin platelets, talc platelets, bismuth oxychloride platelets and mixtures thereof. When the substrate is a metallic substrate in platelet form it is optionally further coated with at least one of metal oxide, metal hydroxide and/or metal oxide hydrate.

In case of non-metallic substrates further preferred substrates are glass platelets, platelets of synthetic mica or $SiO_2$-platelets and most preferred are glass platelets or platelets of synthetic mica.

The synthetic mica platelets usable as substrate are preferably fluorophlogopite of the formula $KMg_3AlSi_3O_{10}F_2$, $KMg_{1/2}(Si_4O_{10})F_2$ or $NaMg_2{}_{1/2}(Si_4O_{10})\ F_2$, especially fluorophlogopite of the formula $KMg_3AlSi_3O_{10}F_2$, which, according to x-ray fluorescence analysis (XRF), preferably has the constituents specified in table 1 as the respective metal oxide within the ranges listed therein.

4

TABLE 1

Preferred compositions of synthetic mica platelets according to XRF Composition of synthetic mica platelets, figures in % by weight, based in each case on the total weight of the synthetic mica platelets

| | |
|---|---|
| $SiO_2$ | 38 to 46 |
| $Al_2O_3$ | 10 to 14 |
| $K_2O$ | 9 to 13 |
| $Fe_2O_3$ | 0.01 to 0.25 |
| $MgO$ | 26 to 34 |
| $MnO$ | 0 to 0.05 |
| $Na_2O$ | 0 to 13 |

The mean thickness of the nonmetallic substrates in platelet form that are to be coated is preferably within a range from 50 nm to 5000 nm, more preferably within a range from 60 nm to 3000 nm and most preferably within a range from 70 nm to 2000 nm. The mean thickness is understood in accordance with the invention to mean the arithmetic mean, unless stated otherwise.

In one embodiment, the mean thickness for glass platelets as the nonmetallic substrate in platelet form that is to be coated is within a range from 750 nm to 1500 nm, preferably within a range from 850 nm to 1400 nm and more preferably within a range from 900 nm to 1300 nm.

Thinner substrates in platelet form lead to a lower overall thickness of the absorbent effect pigments of the invention. Thus, likewise preferred as nonmetallic substrate in platelet form are glass platelets wherein the mean thickness is within a range from 50 nm to 700 nm, further preferably within a range from 101 nm to 600 nm, more preferably within a range from 160 nm to 500 nm and most preferably within a range from 200 nm to 400 nm.

In a further embodiment, the mean thickness of the natural or synthetic mica platelets as the nonmetallic substrate in platelet form that is to be coated is preferably within a range from 80 nm to 1300 nm, further preferably within a range from 90 nm to 1000 nm, more preferably within a range from 99 nm to 800 nm and most preferably within a range from 200 nm to 600 nm.

If nonmetallic substrates in platelet form are coated below a mean thickness of 50 nm with metal oxides of high refractive index, for example, extremely fracture sensitive pigments are obtained, which can break up even on incorporation into the respective application medium, which in turn results in significant lowering of the gloss.

Above a mean substrate thickness of 5000 nm, the pigments can become too thick overall. This is associated with a poorer specific hiding capacity, meaning that the area covered per unit weight of solvochromic effect pigment of the invention is lower. Moreover, such thick pigments have a lower degree of plane parallel orientation to the substrate in the application medium. Poorer orientation in turn results in reduced gloss. With regard to the tactile properties too, excessively thick effect pigments can be disadvantageous in an application.

In one embodiment, the relative standard deviation in the thickness distribution of the nonmetallic substrates in platelet form is 15% to 100%, preferably 17% to 70%, more preferably 19% to 61% and most preferably 21% to 41%. The relative standard deviation in [%] is the quotient of calculated standard deviation and mean thickness.

The metallic substrates in platelet form may be selected from the group consisting of aluminum platelets, copper platelets, zinc platelets, iron platelets, titanium platelets, stainless steel platelets, silver platelets, alloys and mixtures of the above-listed metals.

The afore mentioned metallic substrates in platelet form may also include one or more coatings composed of or comprising at least one metal oxide, metal hydroxide and/or metal oxide hydrate of low refractive index and may optionally have been calcined. For instance, the substrates used may thus also be commercially available coated metal effect pigments. In a preferred embodiment, the substrates to be used in accordance with the invention are uncoated metallic substrates in platelet form. Preferably, such coatings may have just an effect of passivation to allow further handling of the corrosion sensitive metallic substrate in aqueous environment for further coating. Typically, metal oxides like silica or alumina serve this purpose. Si or Al cations are known to either not diffuse into adjacent layers under calcination or they may diffuse, but do not form the characteristic of a "spacer layer" within the meaning in this invention.

The metallic substrates in platelet form are more preferably selected from the group consisting of aluminum platelets, copper platelets, zinc platelets, iron platelets, alloys and mixtures of the above-listed metals. The metallic substrates in platelet form are most preferably selected from the group consisting of aluminum platelets, copper platelets, zinc platelets, alloys and mixtures of the above-listed metals. Especially preferably, the metallic substrates in platelet form used are aluminum platelets.

If aluminum platelets are used as metallic substrate in platelet form, they preferably have an aluminum content of ≥97% by weight, further preferably of ≥98% by weight, more preferably of ≥99% by weight and most preferably of ≥99.7% by weight, based in each case on the total weight of the aluminum platelet. In a preferred embodiment, the aluminum platelets additionally have a mercury content of preferably ≤1 ppm, an arsenic content of preferably ≤2 ppm, a lead content of preferably 10 ppm, a cadmium content of preferably ≤1 ppm, a barium content of preferably ≤10 ppm, a chromium content of preferably ≤20 ppm, a nickel content of preferably ≤20 ppm, a copper content of preferably ≤20 ppm, a cobalt content of preferably ≤20 ppm, an antimony content of preferably 2 ppm, a selenium content of preferably ≤10 ppm and a zinc content of preferably ≤20 ppm.

In a further embodiment, the aluminum or aluminum alloy platelets usable as metallic substrate in platelet form have been subjected to wet-chemical oxidation according to claim 1 of WO 96/38505 A1.

If copper platelets are used as metallic substrate in platelet form, they preferably have a copper content of ≥295% by weight, further preferably of ≥96% by weight, more preferably of ≥97% by weight and most preferably of ≥98% by weight, based in each case on the total weight of the copper platelet. In a preferred embodiment, the copper platelets additionally have a mercury content preferably of ≤1 ppm, an arsenic content preferably of ≤3 ppm, a lead content preferably of 20 ppm, a cadmium content preferably of ≤15 ppm, a barium content preferably of ≤10 ppm, a chromium content preferably of ≤20 ppm, a nickel content preferably of ≤20 ppm, a cobalt content preferably of ≤20 ppm, an antimony content preferably of ≤2 ppm and a selenium content preferably of ≤10 ppm.

If gold bronze platelets are used as metallic substrate in platelet form, they preferably have a copper content from a range from 70% by weight to 95% by weight, a zinc content from a range from <5% by weight to <30% by weight, an aluminum content from a range from 0.01% by weight to ≤1.5% by weight, a tin content from a range from 0.001% by weight to ≤0.5% by weight, based in each case on the total weight of the gold bronze platelets. In a preferred embodiment, the gold bronze platelets additionally have a mercury content preferably of ≤1 ppm, an arsenic content preferably of ≤3 ppm, a lead content preferably of ≤20 ppm, a cadmium content preferably of ≤15 ppm, a barium content preferably of ≤10 ppm, a chromium content preferably of ≤20 ppm, a nickel content preferably of 20 ppm, a cobalt content preferably of ≤20 ppm, an antimony content preferably of ≤2 ppm and a selenium content preferably of ≤10 ppm.

If iron platelets are used as metallic substrate in platelet form, they are preferably produced from carbonyl iron powder that has been subjected to reductive treatment according to claim 1 of EP 1 251 152 A1.

The mean thickness of the metallic substrates in platelet form that are to be coated is preferably within a range from 30 nm to 2000 nm, further preferably within a range from 35 nm to 1500 nm, more preferably within a range from 70 nm to 900 nm and most preferably within a range from 90 nm to 600 nm.

In a further embodiment, the aluminum platelets have a mean thickness according to the respective main claims of WO 2004/087816 A2 or of WO 2008/077612 A2.

In a further embodiment, the iron platelets have a mean thickness according to the main claim of WO 2009/144005 A1.

In one embodiment, the relative standard deviation in the thickness distribution of the metallic substrates in platelet form is 11% to 98%, preferably 22% to 78%, more preferably 28% to 68% and most preferably 34% to 64%. The relative standard deviation in [%] is the quotient of calculated standard deviation and mean thickness.

The mean thickness of the substrate in platelet form is determined, using a cured lacquer film in which the absorbent effect pigments of the invention are aligned essentially plane-parallel to the substrate, according to the details below in section IId "Determination of the mean thickness of the nonmetallic substrates in platelet form, the mean layer thickness of layers 2 and 3, the mean layer thickness of the overall coating, the mean height $h_\alpha$ of the spacer layer and the median of the area size distribution $A_{50}$ of the cavities with SEM". For this purpose, a transverse section of the cured lacquer film is examined under a scanning electron microscope (SEM), wherein the thickness of the nonmetallic substrate in platelet form is determined for at least 100 effect pigments and statistically averaged.

The scanning electron micrographs were obtained using transverse sections of the absorbent effect pigments of the invention with the Supra 35 scanning electron microscope (from Zeiss).

Coatings of Solvochromic Effect Pigments:

Within this invention the terms "layers 2, 3 or 4" denote to layers formed after a calcination step of the coated effect pigment.

Layers coated before calcination are denoted to "layers A, B or C" within this invention.

The layers 2 and 3 comprise in their metal oxide, metal hydroxide and/or metal oxide hydrate in a majority two different metal ions from the group consisting of Ti, Fe or Zr. Such metal oxides have a high refractive index. The literature values for the respective refractive indexes in the optical wavelength region of these metal oxides are >1.8, preferably ≥2.0.

Usually two metal oxides are found in these layers. As outline below this is due to a first metal oxide which was initially coated on the pigment and a second metal oxide which is generated by the diffusion of metal ions during the calcination step of the effect pigments.

In preferred embodiments the solvochromic effect pigment have layers 2 and 3, which are mainly composed of $TiO_2$. Here this $TiO_2$ is the first metal oxide of this layers.

In further preferred embodiments the second metal oxide in layers 2 or 3 is a metal oxide based on the metal ion Fe or Zr, wherein Fe is most preferred.

The particular molecular form of these mixed metal oxide layers of layers 2 or 3 may be not restricted to a specific form. The metal oxides can form mixed phases where the diffused metal ions are located in interstitial sites. Also, it may be possible that the diffused metal oxide may form certain sub-phases within layer 2 or 3. Such sub-phases were reported in WO 2015/183674 A1, for example.

These specific combinations of metal ions in the metal oxide layer have been proven to enable effect pigments with the solvochromic effect.

During the calcination of initially coated substrates also the spacer layer 4 is formed. Here, cavities form due to the diffusion of material in adjacent layers. Therefore, in preferred embodiments the metal ion of the connectors in the spacer layer 4 is mainly composed of Fe or Zr.

In further preferred embodiments a second metal oxide may be present in these connectors by diffusion of metal ions from the adjacent layers into the initial middle layer. Such preferred metal ions are Ti-ions.

The respective two main metal ions in layers 2, 3 and spacer layer 4 of the solvochromic effect pigments are preferably contained therein in an amount of at least 95 wt.-%, based on the whole amount of metal ions in these respective layers. Further preferred the amount of the two main metal ions in layers 2, 3 and spacer layer 4 contained therein are in an amount of at least 97 wt.-%, more preferred at least 98 wt.-% and most preferred at least 99 wt.-%, each based on the whole amount of metal ions in these layers. Other metal ions like, for example, Si or Al, may be present in very small amounts and may be regarded as dopants.

The layers stack of layer 2, the spacer layer 4 and layers 3 constitute a similar layer stack as it is known from so-called multilayer stacks. A multilayer stack has an order of high/low/high refractive index layers which produced enhanced interference colors when compared to single layered pearlescent pigments. Although all metal oxides used for the coating of the solvochromic effect pigments originally have a high refractive index the spacer layer 4 has effectively a significantly lower refractive index compared to layers 2 and 3 due to the substantial amount of cavities formed in this layer. The cavities are most likely filled with air under ambient atmosphere lowering the effective refractive index. In case of contact with a solvent these cavities are likely to be filled at least partially with the solvent which changes the effective index of this layer, preferably to higher values, and thus causes the observed change of the interference color.

In preferred embodiments the molar ratio of Ti to any of Fe or Zr in layers 2, 3 and spacer layer 4 is in a range of 1.3 to 4.0 and more preferred in a range of 1.4 to 3.5 and most preferred in a range of 1.6 to 3.3. Here the concentration of metal ions is determined with XRF when no additional layers containing these metal ions are present.

Should such additional layers be present an analysis using EDX from cross sections in combination with SEM or even TEM may be used.

Below a molar ratio of 1.3 and above 4.0 the formation of the specific structure of the effect pigment coating and especially of the spacer layer 4 is not well developed. Without being bound to a theory it is supposed that within these ratios of the metal ions a maximum of metal ion diffusion during the calcination step is possible and therefore also the formation of the specific structure of the final effect pigment.

To determine the mean height $h_a$ of the spacer layer 4, the mean layer thickness of layers 2 ($h_{l2}$) and 3 ($h_{l3}$) and the mean layer thickness of the overall coating, scanning electron micrographs of transverse sections are used to establish the upper and lower substrate surfaces as baselines. What is meant by the upper and lower substrate surfaces in the scanning electron micrographs of transverse sections is the longer side of the substrate in platelet form in each case. The baseline is drawn onto the scanning electron micrograph of the transverse section along the surface of the substrate in platelet form. The scanning electron micrographs of transverse sections were analyzed with the aid of the AxioVision 4.6.3 image processing software (from Zeiss).

A sufficient number of parallel lines are drawn at 50 nm intervals at a 90° angle from these two baselines as to place a grid over the effect pigment shown exemplary in the scanning electron micrograph of the transverse section in FIG. 1, which represents an effect pigment with layers 2 and 3 and a spacer layer from state-of-the-art effect pigments. The magnification of the scanning electron micrograph of the transverse section is preferably at least 50 000-fold, based on Polaroid 545 (4"×5"). Proceeding from the respective baseline of the nonmetallic substrate in platelet form, in the direction of the respective outer layer 3 or the respective outermost layer, the points of intersection between the parallel lines arranged at right angles to the respective baseline with the respective interfaces of the optional layer 1 with layer 2, of layer 2 with the spacer layer, of the spacer layer with layer 3, and of layer 3 with the environment or with any further layer applied are analyzed manually.

These measurements give rise to the layer thicknesses of layers 2 and 3, the layer thickness of the overall coating, the layer thickness of further layers optionally present, and the height $h_a$ of the spacer layer by formation of differences. The layer thickness of layer 2 is calculated from the difference between the respective measured points of intersection at the respective interfaces of layer 2 with the spacer layer and of either optional layer 1 with layer 2 or the baseline with layer 2 if the nonmetallic substrate in platelet form has not been covered with further layers beforehand. The layer thickness of layer 3 is calculated from the difference between the respective measured points of intersection of layer 3 with the environment or any further layer applied and of the spacer layer with layer 3. The layer thickness of the overall coating is calculated from the difference between the respective points of intersection of layer 3 with the environment or any further layer applied with the environment and the respective baseline. The height $h_a$ of the spacer layer is calculated from the difference of the overall coating thickness minus thickness of layer 2 ($h_{l2}$) minus thickness of layer 3 ($h_{l3}$). between the respective measured points of intersection of spacer layer with layer 3 and layer 2 with the spacer layer.

The individual values of the layer thicknesses and the height $h_a$ that have been determined in this way are used to form the respective arithmetic means in order to determine the above-specified values for the mean layer thicknesses and the mean height $h_a$. To be statistically meaningful, the above-described measurements are conducted on at least 32, preferably at least 60 and more preferably at least 100 of the parallel lines arranged at right angles to the baselines.

As an alternative to transverse sections, the absorbent effect pigments of the invention can be cut by means of the FIB method (FIB=focused ion beam). For this purpose, a fine beam of highly accelerated ions (for example gallium, xenon, neon or helium) is focused to a point by means of ion optics and guided line by line over the effect pigment surface to be processed. On impact with the effect pigment surface, the ions release most of their energy and destroy the coating at this point, which leads to removal of material line by line. It is also possible using the scanning electron micrographs that have then been recorded, by the method described above, to determine the mean height $h_a$, the mean layer thickness of layers 2 and 3 and the mean layer thickness of the overall coating. The mean thickness of the nonmetallic substrate in platelet form can also be determined using scanning electron micrographs of the effect pigments that have been cut by the FIB method.

The at least one spacer layer 4 preferably has a geometric thickness $h_a$ in a range of 100 to 400 nm, more preferably in a range of more than 120 nm to 350 nm and most preferably in a range of 125 to 300 nm.

These thicknesses of $h_a$ are quite high. Below 100 nm the solvochromic effect is not strong enough and above 400 nm the effect pigment can become unstable to mechanical stress and may be difficult to produce. Furthermore, the overall thickness of the coating becomes than unfavorably large leading to limited application properties.

The spacer layer 4 of the solvochromic effect pigments of this invention generally has two different types of characteristic morphologies when viewed with SEM cross-section micrographs. wherein a first type exhibits a "teeth"-like morphology (see FIG. 2) and a second type exhibits a "sponge"-like morphology (see FIG. 3) as more detailed in the experimental section.

In order to further characterize the specific morphologies of the spacer layer the areas of the cavity size in this layer were determined as described in the experimental section. The basis for this analysis are SEM micrographs of cross sections of the pigments with good contrast and good resolution (at least 50,000 based on Polaroid 545 (4"×5")). To determine the area of the cavities in the spacer layer the micrographs were processed with the microscope software AxioVision.

Usually at least 32 cavities, preferably at least 120 cavities are segmented using the software, their areas are measured and afterwards the cumulative distribution is evaluated. Using the quantile function of excel the $A_{50}$-value can be determined from this data. For the solvochromic effect pigments at least 120 cavities are measured, whereas for pigment from the state of the art less cavities might be enough. With this method the area of the cross-section micrographs can be determined, however, not the volume of the cavities as this would require a three dimensional determination. But still the area distribution function gives a good impression of the morphology of the cavities.

Alternatively, it may be possible to automize this counting procedure by applying a suitable segmentation of the micrographs. It is necessary in that case to prepare the photographs by choosing a suitable contrast in such manner, that essentially no drift of the background lightness over the whole section is reached. A uniform illumination of the probe is needed therefore. Then the cavities can be detected automatically, and their area be measured.

The median area of the cavities $A_{50}$ of spacer layer 4 of the solvochromic effect pigment according to this invention is preferably in a range of 80 to 600 nm² and more preferably in a range of 85 to 450 nm² and most preferably in a range of 90 to 375 nm².

Below an $A_{50}$-value of 80 nm² the cavities seem to be too small and above a value of 600 nm² the cavities seem to be too large to enable sufficient capillary forces to evolve the solvochromic properties.

In certain embodiments the solvochromic effect pigments have an area weighted fraction of cavities as determined from SEM micrographs in the spacer layer 4 in a range of 10 to 60%, preferably in a range of 12% to less than 51% and most preferably in a range of 13% to 48%. Here, this fraction is also determined from the cross-section SEM micrographs used for determination of the pore size distribution function. The areas of the cavities are determined and are summarized and the fraction of the cavities is then defined as the sum of all cavity areas divided by the total area of the spacer layer measured.

To enable the reversible diffusion of solvent into the porous spacer layer it is assumed that layer 3, which is the outmost layer of the specific structure of the effect pigments, has also a certain porosity.

The solvochromic effect pigments of the invention are may optionally be coated with further layers between the substrate and optional layer 1 or layer 2. Already mentioned are coatings when using metal substrates such as silica or alumina. Here, these coatings serve mainly to render the metallic substrates stable to prevent gassing. The additional layers may also be coated for obtaining additional interference effects. However, it is very much preferred not to coat the substrate in such way that a metal oxide with a metal ion of the group consisting of Ti, Fe, Sn, Mn, Zr, Ca, Sr, Ba, Ni, Ag, Zn, Cu, Ce, Cr and Co is adjacent to optional layer 1 or to layer 2. If such a metal oxide is coated on the substrate than an additional metal oxide layer comprising the metal ions Si, Al or Mg may preferably follow before the layer stack of optional layer 1, layer 2 spacer layer 4 and layer 3. These metal ions do not seem to diffuse into adjacent layers to form the characteristic properties of a spacer layer. They can thus act as a barrier to the other metal ions which are more capable for diffusion processes.

The solvochromic effect pigments of the invention may optionally be provided with at least one outer protective layer that further increases weathering stability and/or chemical stability and/or further reduces photoactivity.

The optionally present protective layer comprises metal oxides, metal hydroxides and/or metal oxide hydrates wherein the metal ions are selected from the group of metals consisting of Si, Ce, Cr, Al, Zr, Zn and mixtures thereof, preferably from the group of metals Si, Ce, Sn, Al, Zr and mixtures thereof. In this context, the proportion of the optionally present protective layer is preferably within a range from 0.1% by weight to 7.0% by weight, more preferably within a range from 0.2% by weight to 5.2% by weight and most preferably within a range from 0.3% by weight to 3.1% by weight, based in each case on the total weight of the absorbent effect pigment of the invention. These protective layers are aimed to influence the optical properties of the effect pigments to a minimum. Preferred are protective layers as disclosed in EP 2691478 B1 or EP 2904052 E1.

The optionally present protective layer may additionally have been surface modified, for example by silanes. The silanes may have no functional bonding group or one or more functional bonding group(s). Silanes having at least one functional bonding group are also referred to hereinafter as organofunctional silanes.

For example, one or more silanes may have been applied to this outermost protective layer. The silanes may be alkyl silanes having branched or unbranched alkyl radicals having 1 to 24 carbon atoms, preferably 6 to 18 carbon atoms.

In a further preferred embodiment, the silane without a functional bonding group is an alkyl silane. The alkyl silane preferably has the formula $R_{(4-z)}Si(X)_z$. In this formula, z is an integer from 1 to 3, R is a substituted or unsubstituted, unbranched or branched alkyl chain having 10 to 22 carbon atoms, and X is a halogen and/or alkoxy group. Preference is given to alkyl silanes having alkyl chains having at least 12 carbon atoms. R may also be bonded to Si in a cyclic manner, in which case z is typically 2.

In a further embodiment, it is also possible to use at least one organofunctional silane which enables a chemical bond to a plastic, or a binder of a lacquer or a paint, etc., for surface modification. These groups of the organofunctional silane may also be referred to as coupling groups or functional bonding groups and are preferably selected from the group consisting of hydroxyl, amino, acryloyl, methacryloyl, vinyl, epoxy, isocyanate, cyano and mixtures thereof.

The organofunctional silanes having suitable functional groups that are used with preference as surface modifiers are commercially available and are produced, for example, by Evonik and sold under the "Dynasylan" trade name. Further products can be purchased from Momentive (Silquest silanes) or from Wacker, for example standard silanes and α-silanes from the GENIOSIL product group. Examples of these are 3-methacryloyloxypropyltrimethoxysilane (Dynasylan MEMO, Silquest A-174NT), vinyltri(m)ethoxysilane (Dynasylan VTMO and VTEO, Silquest A-151 and A-171), methyltri(m)ethoxysilane (Dynasylan MTMS and MTES), 3-mercaptopropyltrimethoxysilane (Dynasylan MTMO; Silquest A-189), 3-glycidoxypropyltrimethoxysilane (Dynasylan GLYMO, Silquest A-187), tris[3-(trimethoxysilyl)propyl]isocyanurate (Silquest Y-11597), bis[3-(triethoxysilyl)propyl)]tetrasulfide (Silquest A-1289), bis[3-(triethoxysilyl) propyl disulfide (Silquest A-1589), beta-(3,4-epoxycyclohexyl)ethyltrimethoxysi lane (Silquest A-186), bis(triethoxysilyl)ethane (Silquest Y-9805), gamma isocyanatopropyltrimethoxysilane (Silquest A-Link 35, GENIOSIL GF40), methacryloyloxymethyltri(m)ethoxysilane (GENIOSIL XL 33, XL 36), (methacryloyloxymethyl)(m)ethyldimethoxysilane (GENIOSIL XL 32, XL 34), (isocyanatomethyl)methyldimethoxysilane, (isocyanatomethyl)trimethoxysilane, 3-(triethoxysilyl)propylsuccinic anhydride (GENIOSIL GF 20), (methacryloyloxymethyl) methyldiethoxysilane, 2-acryloyloxyethylmethyldimethoxysilane, 2-methacryloyloxyethyltrimethoxysilane, 3-acryloyloxypropylmethyldimethoxysilane, 2-acryloyloxyethyltrimethoxysilane, 2-methacryloyloxyethyltriethoxysilane, 3-acryloyloxypropyltrimethoxysilane, 3-acryloyloxypropyltripropoxysilane, 3-methacryloyloxypropyltriethoxysilane, 3-methacryloyloxypropyltriacetoxysilane, 3-methacryloyloxypropylmethyldimethoxysilane, vinyltrichlorosilane, vinyltrimethoxysilane (GENIOSIL XL 10), vinyltris(2-methoxyethoxy)silane (GENIOSIL GF 58), vinyltriacetoxysilane or mixtures thereof. Preference is given to using, as organofunctional silanes, 3-methacryloyloxypropyltrimethoxysilane (Dynasylan MEMO, Silquest A-174NT), vinyltri(m)ethoxysilane (Dynasylan VTMO and VTEO, Silquest A-151 and A-171), methyltri(m)ethoxysilane (Dynasylan MTMS and MTES), beta-(3,4-epoxycyclohexyl)ethyltrimethoxysilane (Silquest A-186), bis(triethoxysilyl)ethane (Silquest Y-9805), gamma isocyanatopropyltrimethoxysilane (Silquest A-Link 35, GENIOSIL GF40), methacryloyloxymethyltri(m)ethoxysilane (GENIOSIL XL 33, XL 36), (methacryloyloxynethyl)(m)ethyldimethoxysilane (GENIOSIL XL 32, XL 34), 3-(triethoxysilyl)propylsuccinic anhydride (GENIOSIL GF 20), vinyltrimethoxysilane (GENIOSIL XL 10) and/or vinyltris(2-methoxyethoxy)silane (GENIOSIL GF 58).

It is also possible to apply other organofunctional silanes to the particles of the invention or the pigments of the invention.

In addition, it is possible to use aqueous prehydrolyzates commercially available, for example, from Degussa. These include aqueous aminosiloxane (Dynasylan Hydrosil 1151), aqueous amino-/alkyl-functional siloxane (Dynasylan Hydrosil 2627 or 2909), aqueous diamino-functional siloxane (Dynasylan Hydrosil 2776), aqueous epoxy-functional siloxane (Dynasylan Hydrosil 2926), amino-/alkyl functional oligosiloxane (Dynasylan 1146), vinyl-/alkyl-functional oligosiloxane (Dynasylan 6598), oligomeric vinylsilane (Dynasylan 6490) or oligomeric short chain alkyl-functional silane (Dynasylan 9896).

In a preferred embodiment, the organofunctional silane mixture, as well as at least one silane without a functional bonding group, comprises at least one amino functional silane. The amino function is a functional group which can enter into one or more chemical interactions with most of the groups present in binders. This may include a covalent bond, for example with isocyanate or carboxylate functions of the binder, or hydrogen bonds such as with OH or COOR functions, or else ionic interactions. An amino function is therefore of very good suitability for the purpose of chemical attachment of the pigment to various kinds of binder.

Preference is given to taking the following compounds for this purpose: 3-aminopropyltrimethoxysilane (Dynasylan AMMO; Silquest A-1110), 3-aminopropyltriethoxysilane (Dynasylan AMEO), [3-(2-aminoethyl)aminopropyl] trimethoxysilane (Dynasylan DAMO, Silquest A-1120), [3-(2-aminoethyl)aminopropyl]triethoxysilane, triamino-functional trimethoxysilane (Silquest A-1130), bis(gamma-trimethoxysilylpropyl)amine (Silquest A-1170), N ethyl-gamma-aminoisobutyltrimethoxysilane (Silquest A-Link 15), N-phenyl gamma-aminopropyltrimethoxysilane (Silquest Y-9669), 4-amino-3,3-dimethylbutyltrimethoxysilane (Silquest A-1637), ((cyclohexylamino)methyl)(diethoxy)methylsilane (GENIOSIL XL 924), N cyclohexylaminomethyltriethoxysilane (GENIOSIL XL 926), N (phenylaminomethyl)trimethoxysilane (GENIOSIL XL 973) or mixtures thereof.

In a preferred embodiment, the optionally present protective layer has the composition disclosed in any of WO 2006/021386 A1, WO 2012/130897 A1 or WO 2014/053454 A1.

Most preferred effect pigments with solvochromic properties are based on a non metallic substrate and have an optional layer 1 of $SnO_2$, a layer 2 and a layer 3 from a metal oxide having respectively a majority of Ti metal ions, and a spacer layer 4 having a majority of Fe-ions, wherein the ratio of Ti to Fe is in a range of 1.3 to 4.0 and more preferred in a range of 1.4 to 3.5 and most preferred in a range of 1.6 to 3.3.

Method of Production:

A process for manufacturing an effect pigment with solvochromic properties according to this invention comprises the following steps:

(i) optionally applying an uncalcined layer comprising or consisting of at least one of tin oxide, tin hydroxide and/or tin oxide hydrate to the nonmetallic substrate in platelet form, (ii) sequentially applying three uncalcined layers A, B and C each consisting essentially of a single metal oxide, metal hydroxide and/or metal oxide hydrate, where the layers A, B and C are arranged directly one on top of another and wherein the metal ions of layers A, B and C are from the group consisting of Ti, Fe and Zr, wherein the metal ion from layer B is different to the metal ions of layers A or C, (iii) separating the effect pigments obtained in step (iii) from the liquid phase and drying the product, (iv) calcining the dried effect pigments obtained from step (iii) at a temperature in a range of 300° C. to 600° C., wherein the metal ions present in layer B diffuse at least partly into layer A and/or layer C during the calcination step to form the at least one layer 4.

This optional first layer of tin oxide is preferably a $SnO_2$ layer. Usually this layer is applied before deposition of $TiO_2$ as layer A in order to enforce a rutile modification of the $TiO_2$ layer as it is well known in the art. This layer is usually deposited at a pH range from 1.6 to 2.5 using preferably a $Sn(IV)$ salt like $SnCl_4$.

For the layers A, B and C it is very important that they each consist essentially of a single metal oxide, metal hydroxide and/or metal oxide hydrate. With "consisting essentially" it is meant here that they contain at least 98 wt.-%, preferably at least 99 wt.-% of the respective metal ions, based on all metal ions of a respective layer. Small amounts of other metal ions like Si, Al, Mg may be present additionally.

Before deposition of each of these layers the pH is fixed to an appropriate value by adding either acid or base for deposing the respective metal oxide as it is well known in the art. Preferably, the pH is kept constant during the deposition of the metal salt by adding appropriate amounts of a mineral acid or a base.

The layers A, B or C are formed by addition of metal salts like $TiCl_4$, $FeCl_3$ or $ZrCl_4$ in aqueous media. This kind of salts readily undergoes hydrolysis to first form metal hydroxides. As this is a fast reaction the addition needs to be controlled well by feeding the salts solution with dosing rates of preferably a range of $1.0 \times 10^{-4}$ mol/min to $50.0 \times 10^{-4}$ mol/min and more preferably form $1.25 \times 10^{-4}$ mol/min to $40.0 \times 10^{-4}$ mol/min. The particular dosing rate depends also on type of material, size, thickness and concentration of the substrates and can be selected by the skilled person without undue burden.

The drying step is necessary to first dehydrate the coated effect pigment as all metal oxide layers are first present in form of a metal hydroxide and/or metal oxide hydrate as well known in the art. Preferably the drying temperature is in a range of 70° C. to 160° C. and more preferably in a range of 75 to 100° C. The drying step may be conducted under low pressure to better remove excess water. Alternatively, it may be conducted under atmosphere or under inert gas. The time for drying may be between 2 and 48 hours, preferably between 8 and 28 hours.

The calcination step is conducted at a temperature in a range of 300° C. to 600° C. preferably in a range of 420° C. to 550° C. Below 300° C. the mobility of the metal ions does not seem to be sufficient to enable the metal ion diffusion. Above 600° C. the very specific morphologies of the spacer layer for obtaining the solvochromic properties does not seem to be feasible. This contrasts to the formation of effect pigments previously reported having the similar layer structure with a spacer layer where calcination temperatures of 650 to about 1000° C. were mostly used.

In preferred embodiments the effect pigments are calcined under ambient atmosphere. It may be also possible to calcine in a reducing atmosphere, like e.g. a $H_2/N_2$ atmosphere. Under such conditions it is well known to reduce $TiO_2$ to suboxides or to reduce $Fe_2O_3$ to other iron oxides containing a certain amount of Fe(II) ions.

The calcination time should be in a range of preferably at least 25 min to 90 min, more preferably in a range of 30 to 60 min.

Below 25 min usually the structure of the spacer layer is not completely evolved and above 90 min the specific structure of the spacer layer can be destroyed.

In this process the metal ions present in layer B diffuse at least partly into layer A and/or layer C in the calcination step to form the at least one spacer layer 4 with cavities in the calcined effect pigment. Most preferred is a diffusion of metal ions of layer B into both layers A and C. in the other hand also a partial diffusion of metal ions of layers A or C may occur into the forming spacer layer 4.

In very preferred embodiments of this invention the layers A and C are $TiO_2$ and layer B is $Fe_2O_3$ or $ZrO_2$. Thus, the stack of layers A, B and C is preferably $TiO_2/Fe_2O_3/TiO_2$ or $TiO_2/ZrO_2/TiO_2$. Most preferred is a stack of $TiO_2/Fe_2O_3/TiO_2$. These initial stacks seem to have metal ions of optimal mobilities to each other to form the specific morphologies of the spacer layers of the solvochromic effect pigments.

Before the third layer C ($TiO_2$) a thin layer of $SnO_2$ may be formed additionally to enforce the rutile modification.

The skilled person well understands that here for layers A or C "$TiO_2$", for example, does not stand for this formula literally but it includes titanium hydroxides and/or titanium oxide hydrates.

In certain embodiments the thicknesses' of layer A and C are independently in a range of more than 50 to 240 nm, more preferably in a range of 55 to 220 nm and most preferably in a range of 60 to 200 nm. When comparing the thicknesses of these uncalcined layers with the final thicknesses of layers 2 and 3 one has to bear in mind that during calcination there is on one side generally a loss of a layers thickness' due to dehydration, crystallization and densification processes of the metal oxides and on the other side an increase in thickness due to the material diffusion which commences mostly from the middle layer B into the adjacent layers A and C.

In preferred embodiments the ratio of the amount of Ti of layer A to layer C is in a range of 0.20 to 5, more preferably in a range of 0.30 to 3.3 and most preferably in a range of 0.55 to 1.75. Preferably the ratio of Ti-ions in layer A to layer C is in such a relation that quarter wave relations of final layers 2 and 3 can develop. Such quarter wave relation are well known from basic principles of interference phenomena. According to interference theory to have optimized interference increase at a certain wavelength λ, the thicknesses of layers 2 and 3 must be in a relation:

$$\lambda = \frac{4}{2N_2 - 1} h_{l2} = \frac{4}{2N_3 - 1} h_{l3} \tag{1a}$$

with $h_{l2}$ and $h_{l3}$ being the geometrical thicknesses of final layers 2 and 3 and $N_2$ or $N_3$ being independently integers, preferably 1, 2 or 3.

From formula (1a) it follows:

$$\frac{h_{l2}}{h_{l3}} = \frac{2N_2 - 1}{2N_3 - 1} \tag{1b}$$

Therefore, the ratio of $h_{l2}$ to $h_{l3}$ is preferably located at the ratios 5:1, 3:1, 5:3, 1:1, 1:3, 1:5 or 3:5, wherein a deviation of about 10% of these ratios may occur. The final thicknesses of layers 2 and 3 will also be influenced from the amount of diffusion of material from the middle layer B into the adjacent layers A and B.

Regarding the amounts of the metal oxide of layers A and C, preferably of a Ti salt like $TiCl_4$, these amounts are preferably chosen within these ratios.

Within these ratios the amounts of Ti-ions are about equally balanced in layers A and C and thus enable an optimal diffusion equilibrium with the metal ions of the middle layer B.

In further preferred embodiments the stack of layers A, B and C and optional layer (i) of tin oxide does not have an adjacent layer to layer A or the optional tin oxide layer and/or layer C, which is composed of any metal oxide with a metal ion which is capable of diffusion at elevated temperatures of calcination. Such metal ions may be from the group Ti, Fe, Sn, Mn, Zr, Ca, Sr, Ba, Ni, Ag, Zn, Cu, Ce, Cr and Co.

It seems to be of advantage for evolving layers 2, 3 and the spacer layer 4 during calcination to not have any more other metal ions in adjacent layers which may cause a different diffusion behavior which does not lead to the desired layer structure needed for the solvochromic properties of the effect pigment.

The effect pigments can be coated with any kind additional layers if these layers are not further calcined. These are typically coatings for weather stability as mentioned above.

Use:

A further embodiment is the use of the solvochromic effect pigments, which is preferably in single coated cosmetic applications, in powder coating, plastics, bronzing or as the top coating of a coating application involving several layers. The top coating here is the last coating which that contact to the environment. This can be for example a primer followed by a coating containing the solvochromic effect pigments. The coating applications may involve coatings of, for example, furniture in locations with high sanitary standards such as hospitals, nursing homes or rest homes. Further applications may involve coatings on play and fun articles like toys, black boards, plastic walls for children, furniture, walls, floors, window frames, public toilets, public buildings, like offices, airports and the like. Further application may involve the use of the solvochromic effect pigment in water level indicators. In cosmetic applications the use of the solvochromic effect pigment in nail polishes is preferred but not limited to it.

For example, a furniture coated in a single coating comprising the solvochromic effect pigments may change its color when cleaned with a wet tissue. All spots with still insufficient cleaning are immediately visible which can ensure a complete cleaning of the furniture. Furthermore, the furniture is improved in it's optical appearance by a coating exhibiting a pearlescent effect.

Another possible use are bronzing applications. In this old printing method a draw down is made with an effect pigment paste or powder on a binder formulation. After evaporation of the solvent the effect pigment is oriented plane-parallel to the substrate and exhibits a high gloss and chroma. It is mechanically stabilized by the binder on the back side of the pigment. When coming into contact with solvent the effect pigments are well capable of showing the solvochromic effect.

In further embodiments of this invention are directed to cosmetic formulations or coating formulations comprising the solvochromic effect pigments. The coating formulation can also comprise printing inks.

Further embodiments of this invention are directed to an article comprising a coating which contains the solvochromic effect pigments. Such articles may be furniture, metallic substrates, foils, walls, floors, window frames, public toilets, public buildings or paper substrates.

EXAMPLES

Example 1: (Layer Stack: $TiO_2/Fe_2O_3/TiO_2$ 200 g of synthetic fluorphlogopite with a particle size characteristic (determined with Malvern Mastersizer MS 2000) of $D_{10}=2.3$ μm, $D_{50}=7.1$ μm, $D_{90}=15.4$ μm, Span $\Delta D=1.85$ and an average thickness of about 150 nm were suspended in 1.300 ml water and heated to 85° C. under vigorous stirring. The pH was lowered to 2.2. By adding 50.0 mL of a solution of $SnCl_4$ (c=55 g/L) within 50 minutes a layer of "$SnO_2$" was coated on the substrates surface.

Then the pH-value was further lowered to 1.9 using diluted hydrochloric acid and a solution of 1100 ml $TiCl_4$ (200 g/l $TiO_2$) was dosed to the mixture. After 35 h dosing was completed, the mixture was stirred for 10 min and 750 ml of the suspension was removed. Then 620 ml of an aqueous $FeCl_3$ solution with a density of 1.42 g/cm$^3$ was added for 6.5 h. Afterwards the mixture was again stirred for 10 min and 1000 ml of the suspension was removed. The pH was lowered to 1.9 and 900 ml of a $TiCl_4$ (200 g/l $TiO_2$) solution was dosed within 28.6 h to the mixture. The suspension was filtrated and the filter cake was washed with purified water. The product was dried for 24 h at a temperature of 80° C. in a BINDER WTB vacuum oven under 0.1 bar atmosphere. Finally, the effect pigment was calcined at 500° C. for 45 min in a Nabertherm furnace device equipped with Programm Controller 27.

Extremely chromatic and highly lustrous effect pigments with solvochromic properties were obtained.

Example 2: (Layer Stack: $TiO_2/Fe_2O_3/TiO_2$ 100 g of synthetic fluorophlogopite with a particle size characteristic (determined with Malvern Mastersizer MS 2000) of $D_{10}=35.8$ μm, $D_{50}=55.2$ μm, $D_{90}=112$ μm, Span $\Delta D=1.38$ and an average thickness of about 800 were suspended in 1.000 ml water and heated to 90° C. under vigorous stirring. The pH was lowered to 2.2. By adding 25 mL of a solution of $SnCl_4$ (c=55 g/L) within 50 minutes a layer of "$SnO_2$" was coated on the substrates surface.

Then the pH-value was further lowered to 1.9 using diluted hydrochloric acid and a solution of 150 ml $TiCl_4$ (200 g/l $TiO_2$) was dosed within 3.33 h to the mixture. After dosing was completed the mixture was stirred for 10 min and the pH was fixed to 2.6. 95 ml of an aqueous $FeCl_3$ solution with a density of 1.42 g/cm$^3$ was added within 2 h. Afterwards the mixture was again stirred for 10 min and the pH was lowered to 1.9 and 100 ml of a $TiCl_4$ (200 g/l $TiO_2$) solution was dosed within 2.22 h to the mixture. 1000 mL of the suspension were removed before adding further 50 ml of the $TiCl_4$ solution. The suspension was then filtrated and the filter cake was washed with purified water. The product was dried for 24 h at a temperature of 80° C. in a BINDER WTB vacuum oven under 0.1 bar atmosphere. Finally, the effect pigment was calcined at 500° C. for 45 min using the equipment of Example 1.

Extremely chromatic effect and highly lustrous pigments with solvochromic properties were obtained.

Example 3: (Layer Stack: $TiO_2/Fe_2O_3/TiO_2$)

100 g of glass platelets with a particle size characteristic (determined with Malvern Mastersizer MS 2000) of $D_{10}=18.8$ μm, $D_{50}=33.1$ μm, $D_{90}=57.5$ μm, Span $\Delta D=1.17$ and an average thickness of about 1300 nm were suspended in 1,200 ml water and heated to 90° C. under vigorous stirring. The pH was lowered to 2.2. By adding 40 mL of a solution of $SnCl_4$ (c=25 g/L) within 40 minutes a layer of "$SnO_2$" was coated on the substrates surface. Then the pH-value was further lowered to 1.9 using diluted hydrochloric acid and a solution of 165 ml $TiCl_4$ (100 g/l $TiO_2$) was dosed within 5 h to the mixture. After dosing was completed the mixture was stirred for 10 min and the pH was fixed to 2.6. 125 ml of an aqueous $FeCl_3$ solution with a density of 1.21 g/cm³ was added within 2.5 h and additionally stirred for one hour. Afterwards the pH was lowered to 1.9 and 85 ml of a $TiCl_4$ (100 g/l $TiO_2$) solution was dosed for 5.5 h to the mixture. 1000 mL of the suspension were removed before adding further 10 ml of the $TiCl_4$ solution. The suspension was then filtrated and the filter cake was washed with purified water. The product was dried for 24 h at a temperature of 80° C. in a BINDER WTB vacuum oven under 0.1 bar atmosphere. Finally, the effect pigment was calcined at 450° C. for 60 min using the equipment of Example 1.

Extremely chromatic effect pigments with solvochromic properties and significant sparkle were obtained.

Example 4: (Layer Stack: $TiO_2/Fe_2O_3/TiO_2$)

100 g of synthetic fluorophlogopite with a particle size characteristic (determined with Malvern Mastersizer MS 2000) $D_{10}=10.7$ μm, $D_{50}=21.5$ μm, $D_{90}=39.2$ μm, Span $\Delta D=1.33$ and an average thickness of about 400 nm were suspended in 1.000 ml water and heated to 90° C. under vigorous stirring. The pH was lowered to 2.2. By adding 27.5 mL of a solution of $SnCl_4$ (c=55 g/L) within 50 minutes a layer of "$SnO_2$" was coated on the substrates surface. Then the pH-value was further lowered to 1.9 using diluted hydrochloric acid and a solution of 300 ml $TiCl_4$ (200 g/l $TiO_2$) was dosed within 6.75 h to the mixture. After dosing was completed the mixture was stirred for 10 min and the pH was fixed to 2.6. 220 ml of an aqueous $FeCl_3$ solution with a density of 1.42 g/cm³ was added for 4.55 h and additionally stirred for one hour. Afterwards the pH was lowered to 1.9 and 292 ml of a $TiCl_4$ (200 g/l $TiO_2$) solution was dosed to the mixture. 1000 mL of the suspension was removed before adding further 25 ml of the $TiCl_4$ solution. The suspension was then filtrated and the filter cake was washed with purified water. The product was dried for 24 h at a temperature of 80° C. in a BINDER WTB vacuum oven under 0.1 bar atmosphere. Finally, the effect pigment was calcined at 530° C. for 35 min using the equipment of Example 1.

Extremely chromatic and highly lustrous effect pigments with solvochromic properties were obtained.

Example 5: (Layer Stack: $TiO_2/Fe_2O_3/TiO_2$)

100 g of synthetic fluorophlogopite with a particle size characteristic (determined with Malvern Mastersizer MS 2000) $D_{10}=10.7$ μm, $D_{50}=21.5$ μm, $D_{90}=39.2$ μm, Span $\Delta D=1.33$ and an average thickness of about 400 nm were suspended in 1.000 ml water and heated to 90° C. under vigorous stirring. The pH was lowered to 2.2. By adding 27.5 mL of a solution of $SnCl_4$ (c=55 g/L) within 50 minutes a layer of "$SnO_2$" was coated on the substrates surface.

Then the pH-value was further lowered to 1.9 using diluted hydrochloric acid and a solution of 560 ml $TiCl_4$ (200 g/l $TiO_2$) was dosed within 25 h to the mixture. After dosing was completed the mixture was stirred for 10 min and the pH was fixed to 2.6. 210 ml of an aqueous $FeCl_3$ solution with a density of 1.42 g/cm³ was added for 4.5 h and additionally stirred for one hour. Afterwards the pH was lowered to 1.9 and 300 ml of a $TiCl_4$ (200 g/l $TiO_2$) solution was dosed to the mixture. 1000 mL of the suspension were removed before adding further 25 ml of the $TiCl_4$ solution. The suspension was then filtrated and the filter cake was washed with purified water. The product was dried for 24 h at a temperature of 80° C. in a BINDER WTB vacuum oven under 0.1 bar atmosphere. Finally, the effect pigment was calcined at 530° C. for 35 min using the equipment of Example 1.

Extremely chromatic and highly lustrous effect pigments with solvochromic properties were obtained.

Example 6: (Layer Stack: $TiO_2/ZrO_2/TiO_2$)

150 g of synthetic fluorophlogopite with a particle size characteristic (determined with Malvern Mastersizer MS 2000) $D_{10}=10.7$ μm, $D_{50}=21.5$ μm, $D_{90}=39.2$ μm and Span $\Delta D=1.33$ and an average thickness of about 400 nm were suspended in 850 ml water and heated to 75° C. under vigorous stirring. The pH was lowered to 2.2. By adding 40 mL of a solution of $SnCl_4$ (c=55 g/L) within 75 minutes a layer of "$SnO_2$" was coated on the substrates surface. Then the pH-value was further lowered to 1.9 using diluted hydrochloric acid and a solution of 450 ml $TiCl_4$ (200 g/l $TiO_2$) was dosed within 4.7 h to the mixture. After dosing was completed, the mixture was stirred for 10 min, the pH was fixed to 3.8 and 666 ml of a 20 wt.-%, aqueous zirconium tetrachloride solution was dosed for 7.3 h to the mixture. The reaction suspension was stirred for further 3 h. Then the pH-value was further lowered to 1.9 using diluted hydrochloric acid and a solution of 222 ml $TiCl_4$ (200 g/l $TiO_2$) was dosed to the mixture. Then 500 mL of the suspension were removed before adding further 25 ml of the $TiCl_4$ solution. The suspension was then filtrated and the filter cake was washed with purified water. The product was dried for 24 h at a temperature of 80° C. in a BINDER WTB vacuum oven under 0.1 bar atmosphere. Finally, the effect pigment was calcined at 530° C. for 35 min using the equipment of Example 1.

Extremely chromatic and highly lustrous effect pigments with solvochromic properties were obtained.

Example 7: (Layer Stack: $TiO_2/Fe_2O_3/TiO_2$)

215 g of an aluminum flake paste (STAPA METALLUX 214, s.c.: 69%, Eckart GmbH) were suspended in 650 g ethanol for 10 min. Thereafter 20 g water (in fully desalted quality) were added and the mixture was heated to 75° C. The pH was adjust with acetic acid to 5.0 and a 1:1 vol/vol mixture of 330 ml of Titan(IV)isopropylate und isopropyl alcohol were dosed for 11 h. Afterwards 10 g water were added and the mixture was stirred for 30 min. Afterwards 200 ml of an ethanolic $FeCl_3$ solution (w($FeCl_3$)=40.0 wt.-% were dosed at constant pH 5.5 which was adjusted by addition of an ethanolic NaOH solution (10 wt.-% NaOH) within 6.7 h. Afterwards the mixture was stirred for 30 min and then 340 ml of a 1:1 vol/vol mixture of Titan(IV) isopropylate und isopropyl alcohol were constantly dosed at an rate of 0.5 mL/min at pH 5.0. Afterwards the suspension was stirred for further 60 min and then the hot mixture was filtrated with a Buchner funnel and was washed with a 1.1 vol/vol mixture of water and ethanol. Finally, the filter cake was washed with ethanol to remove water and was dried under $N_2$-atmosphere at 100° C. for 17 hours. The dried metal effect pigment powder was further treated under nitrogen at 450° C. for 60 min using the equipment of Example 1.

Metal effect pigments with an orange-colored absorption color and a solvochromic effect were obtained.

If not mentioned otherwise, feed rates for same chemicals in the recipes were kept constant.

Comparative Example 1: Example 1 of EP 3234024 A1.
Comparative Example 2: Example 5 of EP 3034563 A1.
Comparative Example 3: Example 3 of EP 3234024.
Comparative Example 4: Example 10 of EP 3234024 A1
Comparative Example 5: Example 6 of EP 3 234 024 A1.
Comparative Example 6: Example 4 of EP 3 234 025 A1.
Comparative Example 7: Example 1 of EP 3 234 025 A1.
Comparative Example 8: Example 3 of EP 3 234 025 A1.

Comparative Example 9: "Xirona Le Rouge"

Pearlescent pigment from Merck consisting of $Fe_2O_3$ coated $SiO_2$ flakes.

Comparative Example 10: "Magic Mauve"

Color shifting pearlescent pigment from Merck consisting of $TiO_2$ coated $SiO_2$ flakes.

Comparative Example 11: Iriodin 307

Multilayer pearlescent pigment from Merck with layer stack: $TiO_2/Fe_2O_3/SiO_2/TiO_2$.

II Characterization of the Solvochromic Effect Pigments and Pigments from Comparative Examples IIa Particle Size Measurement The size distribution curve of the absorbent effect pigments of the invention and of the pigments from the comparative examples was determined using the Malvern Mastersizer 2000 instrument, according to the manufacturer's instructions and using an appropriate SOP. For this purpose, about 0.1 g of the respective pigment was introduced into the sample preparation cell of the measuring instrument by means of a Pasteur pipette as an aqueous solution, without addition of dispersing aids, with constant stirring, and analyzed repeatedly. The individual measurement results were used to form the medians. The scattered light signals were evaluated by the Fraunhofer method as volume-weighted values of equivalent spheres.

The median particle size $D_{50}$ in the context of this invention is understood to mean the $D_{50}$ of the cumulative frequency distribution of the volume-averaged size distribution function. The $D_{50}$ indicates that 50% of the pigments have a diameter equal to or less than the value reported, for example 20 µm. Correspondingly, the $D_{10}$ and $D_{90}$ respectively state that 10% and 90% of the pigments have a diameter equal to or less than the respective measured value. The span $\Delta D$, defined as $$\Delta D = \frac{D_{90} - D_{10}}{D_{50}}$$

is a common indication value characterizing the breadth of the particle size distribution. With regard to the visual appearance of the absorbent effect pigments of the invention, a small value of $\Delta D$, i.e. a narrow span, is preferred.

TABLE 2

Particle size distribution data of Examples and Comparative Examples

| Example/ Comparative Example | $D_{10}$ [µm] | $D_{50}$ [µm] | $D_{90}$ [µm] | Span |
|---|---|---|---|---|
| Example 1 | 4.1 | 9.5 | 17.7 | 1.44 |
| Example 2 | 22.0 | 52.7 | 108.3 | 1.64 |
| Example 3 | 16.4 | 32.6 | 58.9 | 1.30 |
| Example 4 | 7.8 | 18.3 | 30.1 | 1.55 |
| Example 5 | 11.7 | 23.0 | 41.6 | 1.30 |
| Example 6 | 12.3 | 23.6 | 42.4 | 1.27 |
| Example 7 | 12.4 | 23.2 | 41.9 | 1.27 |
| Example 8 | 9.3 | 22.0 | 40.6 | 1.43 |
| Example 9 | 20.6 | 35.9 | 58.2 | 1.05 |
| Comparative Example 1 | 10.8 | 22.5 | 40.6 | 1.33 |
| Comparative Example 2 | 10.5 | 23.6 | 42.8 | 1.37 |
| Comparative Example 3 | 12.4 | 23.7 | 42.1 | 1.25 |
| Comparative Example 4 | 8.8 | 20.1 | 37.6 | 1.43 |
| Comparative Example 5 | 9.3 | 20.9 | 39.7 | 1.48 |
| Comparative Example 6 | 9.2 | 20.7 | 39.7 | 1.48 |
| Comparative Example 7 | 10.0 | 21.9 | 40.2 | 1.38 |
| Comparative Example 8 | 8.3 | 20.7 | 40.8 | 1.567 |
| Comparative Example 9 | 9.7 | 19.3 | 35.5 | 1.34 |
| Comparative Example 10 | 8.8 | 20.7 | 39.8 | 1.50 |
| Comparative Example 11 | 11.5 | 23.4 | 43.9 | 1.38 |

IIb Angle-Dependent Color Measurements; Characterization of Solvochromic Effect

To measure the color and brightness values, the effect pigments of the invention and some of the pigments from the comparative examples were stirred into a conventional nitrocellulose lacquer (Erco 2615e bronze mixing lacquer colorless; from Maeder Plastiklack AG at a pigmentation level of 6% by weight, based on the total weight of the wet lacquer. This was done by initially charging the respective pigments and then dispersing them into the lacquer with a brush. The finished lacquer was applied to black/white hiding charts (Byko-Chart 2853, from Byk Gardner) in a wet film thickness of 40 µm or of 76 µm (example 4) with a spiral applicator on an applicator drawdown apparatus (RK Print Coat Instr. Ltd. Citenco K 101 drawdown apparatus), and subsequently dried at room temperature. The choice of spiral applicator depends on the size of the effect pigments: for pigments with $D_{50}$-values of smaller then 40 µm a spiral applicator of 40 m and for pigments with $D_{50}$-values of 40 to 85 µm a 76 µm spiral applicator was used.

The such prepared drawdowns have been wetted with a tiny amount of an isopropanol/water 1:1 (w/w) mixture for 20 seconds and afterwards the supernatant was removed by wiping with a lint-free cloth. A visual color change could be observed in case of the inventive examples. After several minutes, when the surface started to dry, the color changed back repeatedly to the original color. This procedure was repeated at least 10 times. Here, the color impression was reported qualitatively as on wetted parts of the draw-downs color measurements are not feasible. The results for all samples are depicted in table 3.

All inventive examples show a solvochromic effect which was reversible for at least ten cycles. All comparative examples did not exhibit a visible color change upon wetting and therefore exhibited no solvochromic effect.

In order to more quantify the solvochromic effect another series of experiments were conducted. The draw-downs solvochromic effect pigments and is treated with additional solvents and therefore kind of represents a "frozen" solvochromic effect.

The absolute values of the color changes are of course dependent on the refractive index of the dried clear lacquer film. The results of the measurements are depicted in table 3.

TABLE 3

Results of visual color determination of wetting experiments and measured Hue's at 15° of Examples and various Comparative Examples with and without clear coating

| Sample | Color of Drawdown before wetting | Color of drawdown after wetting | Color change for 10x? | $H^*_{(15°CC)}$ | $H^*_{(15°woCC)}$ | $\Delta H^*_{(15°)}$ |
|---|---|---|---|---|---|---|
| Example 1 | Orange | Olive green | yes | 109.04 | 71.3 | 37.77 |
| Example 2 | Orange sparkeling | Light green | yes | 91.56 | 78.2 | 13.35 |
| Example 3 | Yellow | Green | yes | 85.96 | 62.7 | 23.23 |
| Example 4 | Light bluish green | Intense yellowish green | yes | 151.61 | 114.5 | 37.10 |
| Example 5 | Brick red | Orange | yes | 64.89 | 45.3 | 19.63 |
| Example 6 | Orange | Pinkish red | yes | 56.12 | 78.9 | −22.83 |
| Example 7 | Brick red metallic | Orange metallic | yes | 45.7 | 36.2 | 9.47 |
| Comparative Example 1 | Gold | Gold | no | 99.7 | 95.62 | −4.08 |
| Comparative Example 2 | Gold dark | Gold dark | no | | | |
| Comparative Example 3 | Blue | Blue | no | | | |
| Comparative Example 4 | Intense Red | Intense Red | no | 33.3 | 30.04 | −3.26 |
| Comparative Example 5 | Intense Red | Intense Red | no | 7.2 | 9.64 | −2.48 |
| Comparative Example 6 | Red | Red | no | 36.0 | 40.8 | 4.81 |
| Comparative Example 7 | Intense red | Intense red | no | 7.5 | 11.0 | −3.5 |
| Comparative Example 8 | Intense red | Intense red | no | | | |
| Comparative Example 9 | Intense red | Intense red | no | 23.86 | 26.31 | 2.45 |
| Comparative Example 10 | Violet | Violet | no | 91.87 | 91.30 | −0.57 |
| Comparative Example 11 | Gold | Gold | no | 354.8 | 352.2 | −2.6 | described above were partially coated with a clear lacquer. Therefore, a commercially available acrylate based clear lacquer was used which was applied with a thickness of 40 μm of the wet coating on the hiding charts. With this clear lacquer additional organic solvent is introduced which could come into contact with the effect pigments embedded in the coating beneath.

A BYK-mac multi-angle colorimeter (from Byk-Gardner) was used to determine the color values on the black background of the hiding chart at a constant angle of incidence of 45° (according to the manufacturer's instructions) at various observation angles relative to the specular angle. Characterization of the color tone was accomplished using especially the Hue value's H*15°, which were measured at a measurement angle separated by 15° from the specular angle on the black background of the black/white hiding chart. Measurements at this angle essentially characterize the interference color of the effect pigments.

After drying the area coated with the clear lacquer was measured on black background sites using the BYK-mac instrument. To characterize the solvochromic effect the difference of the Hue $\Delta H^*_{15}$ according to the formula (II) was used:

$$\Delta H^* = H^*_{15°(CC)} - H^*_{15°(woCC)} \tag{II}$$

Herein $H^*_{(15°\ CC)}$ is the Hue at 15° measured on the clear lacquer and $H^*_{(15°\ woCC)}$ is the Hue at 15° measured on the application without clear lacquer coating.

The difference $\Delta H^*_{15}°$ is a measure of the color shift which can be reached if the coating is pigmented with the By coating with the clear lacquer the effect pigments located in the base coat beneath come into contact with solvent from the clear coating. All inventive Examples exhibit a rather strong shift of $\Delta H^*_{(15°)}$ which is an indication of a strong solvochromic effect. The pigments of the Comparative Examples in contrast exhibit a much smaller shift of $\Delta H^*_{(15°)}$, even if they are so called "color-flopper" such as comparative example 10. This color-flopper pigment exhibits a strong angle dependence of the color, but does not show a significant angle solvochromic effect.

The solvochromic effect is dependent on the gaseous pressure of the solvent and is reversible. By coating with a clear coating this effect can be frozen and better made quantifiable as described above.

Like all the effect pigments of the inventive examples the comparative examples 1 to 8 do have a porous spacer layer. However, only the inventive examples exhibit the solvochromic effect.

IIc X-Ray Fluorescence Analysis (XRF)

The metal oxide, metal hydroxide and/or metal oxide hydrate contents of the solvochromic effect pigments of the invention and of the pigments from the comparative examples were determined by means of x-ray fluorescence analysis (XRF). For this purpose, the respective pigments were incorporated into a lithium tetraborate glass tablet, fixed in solid sample measuring cups and analyzed therefrom. The measuring instrument used was the Advantix ARL system from Thermo Scientific. The results are shown in table 4. The figures for the different contents are reported here as $TiO_2$ for titanium, as $Fe_2O_3$ for iron, as $SnO_2$ for tin and as $ZrO_2$ for zirconium. Furthermore, the molar ratio of the content of Ti to Fe or to Zr in their elemental form is depicted.

TABLE 4

| | | SEM- analysis | | | | XRF (wt .- % as oxide) | | | | Ratio Ti/Fe or Ti/Zr |
|---|---|---|---|---|---|---|---|---|---|---|
| Sample | Initial layer stack before calcination | $h_{l2}$ [nm] | $h_{l3}$ [nm] | $h_a$ [nm] | $A_{50}$/ [nm²] | Ti | Fe | Sn | Zr | (elemental, molar |
| Example 1 | TiO₂/Fe₂O₃/TiO₂ | 80 | 92 | 110 | 113 | 52.5 | 22.7 | 0.25 | | 2.0 |
| Example 2 | TiO₂/Fe₂O₃/TiO₂ | 68 | 74 | 116 | 182 | 30.6 | 13.2 | 0.47 | | 2.0 |
| Example 3 | TiO₂/Fe₂O₃/TiO₂ | 49 | 98 | 124 | 203 | 24.5 | 10.8 | 0.39 | | 1.9 |
| Example 4 | TiO₂/Fe₂O₃/TiO₂ | 54 | 113 | 130 | 164 | 42.5 | 19.8 | 0.36 | | 1.8 |
| Example 5 | TiO₂/Fe₂O₃/TiO₂ | 153 | 79 | 128 | 241 | 51.9 | 17.5 | 0.32 | | 2.5 |
| Example 6 | TiO₂/ZrO₂/TiO₂ | 79 | 39 | 163 | 368 | 46 | / | 0.15 | 23.2 | 1.6 |
| Example 7 | TiO₂/Fe₂O₃/TiO₂ | 43 | 51 | 86 | 156 | 22.5 | 34.2 | / | / | 1.7 |
| Comparative Example 1 | TiO₂/Fe₂O₃/TiO₂/Fe₂O₃ | 85 | 91 | 20 | 4,944 | 57.7 | 6.9 | 0.78 | / | 7.2 |
| Comparative Example 2 | Fe₂O₃/TiO₂/Fe₂O₃/TiO₂/Fe₂O₃ | 85 | 91 | 24 | 1,362 | 37.8 | 7.3 | / | / | 4.4 |
| Comparative Example 3 | TiO₂/Fe₂O₃/TiO₂/Fe₂O₃ | 66 | 65 | 20 | 1,288 | 47.2 | 5.8 | 0.55 | / | 7.0 |
| Comparative Example 4 | Fe₂O₃/TiO₂/Fe₂O₃ | 118 | 82 | 18 | 382 | 9.1 | 51.1 | / | / | 0.2 |
| Comparative Example 5 | Fe₂O₃/SnO₂/Fe₂O₃ | 70 | 99 | 35 | 65,511 | / | 65.8 | 4.3 | | 0.0 |
| Comparative Example 6 | (SnO₂)/TiO₂/SnO₂/Fe₂O₃ | 113 | 113 | 56 | 5,296 | 25.8 | 34.4 | 3.4 | | 0.6 |
| Comparative Example 7 | Fe₂O₃/SnO₂/Fe₂O₃ | 67 | 107 | 46 | 20,402 | / | 55.9 | 3.8 | | 0.0 |
| Comparative Example 8 | Fe₂O₃/SnO₂/Fe₂O₃ | | | | 8,512 | | | | | 0.0 |
| Comparative Example 9 | Fe₂O₃ | / | / | / | / | / | 57.7 | / | | |
| Comparative Example 10 | SnO₂/TiO₂ | / | / | / | / | 10.4 | / | 2.3 | | |
| Comparative Example 11 | TiO₂/Fe₂O₃/SiO₂/TiO₂ | / | / | / | / | 27.1 | 18.8 | 0.4 | | |

$h_{l2}$ [nm] = average thickness of layer 2;
$h_{Sl3}$ [nm] = average thickness of layer 3
$h_a$ [nm] = average thickness of porous layer 4
$A_{50}$ [nm²]: median of area size distribution of cavities in porous layer 4

IId Determination of the Mean Thickness of the Substrates in Platelet Form, the Mean Layer Thickness of Layers 2 and 3, the Mean Layer Thickness of the Overall Coating, the Mean Height $h_a$ of the Spacer Layer and the Area Size Distribution a of the Cavities with SEM For this purpose, the effect pigments of the examples and comparative examples were incorporated in a concentration of 10 wt.-% into a two-component clearcoat, Autoclear Plus HS from Sikkens GmbH, with a sleeved brush, applied to a film with the aid of a spiral applicator (wet film thickness 26 μm) and dried. After a drying time of 24 h, transverse sections of these applicator drawdowns were produced. The transverse sections were analyzed by SEM (Zeiss supra 35) (using the SE (secondary electrons) detector). To determine the mean layer thickness of layers 2 and 3, the mean thickness of the overall coating, the mean height $h_a$ of the spacer layer and the median of the area size distribution $A_{50}$ of the cavities, the upper and lower substrate surfaces, i.e. the longer side of the substrate in platelet form recognizable in each case in the SEM transverse section, were each used as the baseline. The baseline was drawn here along the surface of the substrate in platelet form in the scanning electron micrograph of the transverse section by connecting the two points of intersection of nonmetallic substrate in platelet form—optional layer 1 or of nonmetallic substrate in platelet for—layer 2 from the left—and right-hand edges of the scanning electron micrograph of the transverse section to one another by means of a straight line. The scanning electron micrographs of transverse images were analyzed with the aid of the AxioVision 4.6.3 image processing software (from Zeiss).

A sufficient number of parallel lines were drawn at 50 nm intervals at a 90° angle from these two baselines as to place a grid over the complete scanning electron micrograph of the transverse section of the effect pigment as depicted exemplary in FIG. 1 which represents an effect pigment with layers 2 and 3 and a spacer layer from state-of-the-art effect pigments. In this figure an effect pigment having a so-called "spacer layer" from the state of the art is shown. The magnification of the scanning electron micrograph of the transverse section was preferably at least 50,000-fold, based on Polaroid 545. Proceeding from the respective upper and lower baselines of the nonmetallic substrate in platelet form in the direction of layer 3 in each case, the distances between the points of intersection of these lines at the respective interfaces of the optional layer 1 with layer 2, of layer 2 with the spacer layer 4, of spacer layer with layer 3 and of layer 3 with the environment were measured manually.

These measurements yielded the layer thicknesses of layer 2 ($h_{l2}$) and of layer 3 ($h_{l3}$), the thickness of the overall coating ($h_{tot}$), and the height $h_a$ of the spacer layer by formation of differences. Height $h_a$ is the overall coating thickness ($h_{tot}$) minus thickness of layer 2 ($h_{l2}$) minus thickness of layer 3 ($h_{l3}$).

The individual values of the layer thicknesses, the height $h_a$ that have been determined in this way were used to form the respective arithmetic means in order to determine the above-specified values for the mean layer thicknesses and the mean height $h_a$. To be statistically meaningful, the above-described measurements were conducted on at least 60 lines. The term "mean" in all cases means the arithmetic mean.

Cross sections of the pigments of the comparative examples which exhibit a spacer layer were characterized in the same manner as described above.

Figure 2:
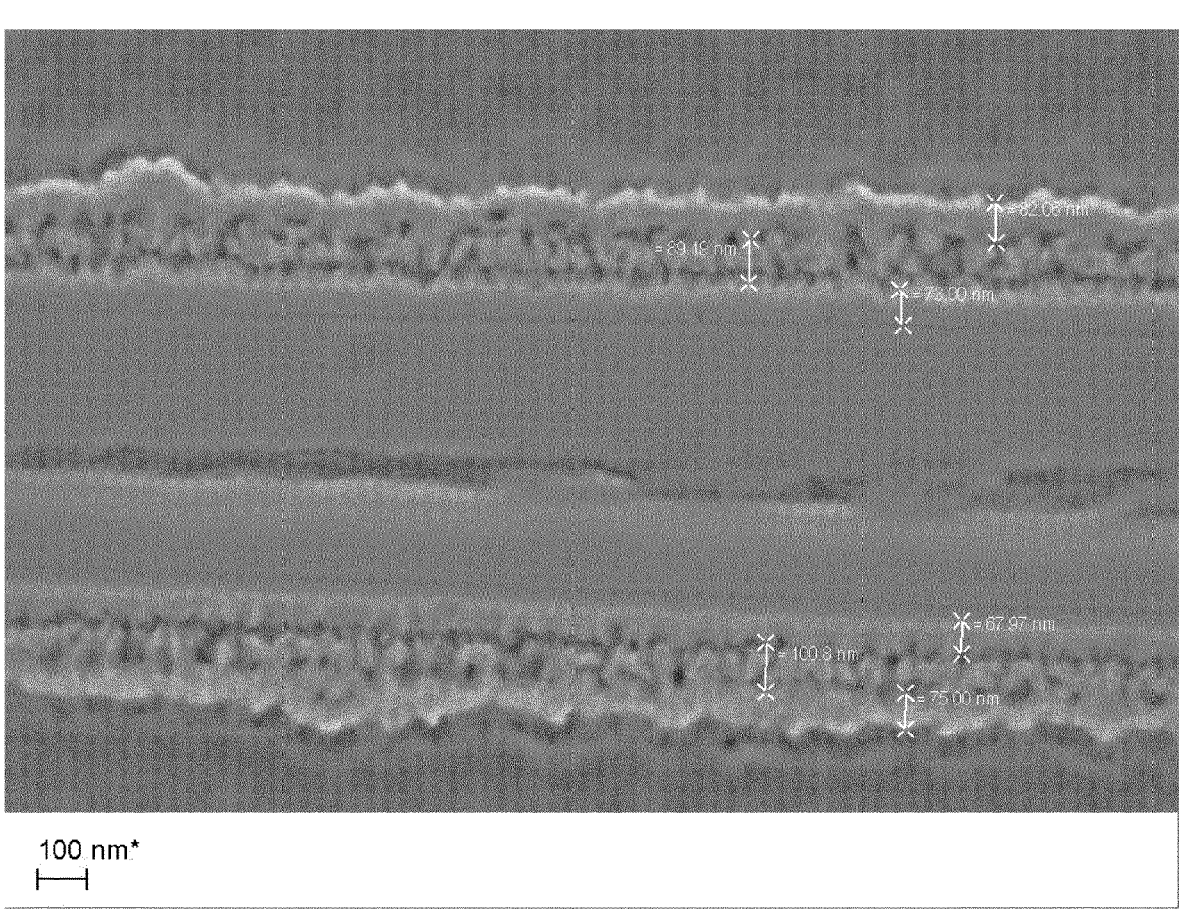
Figure 3:
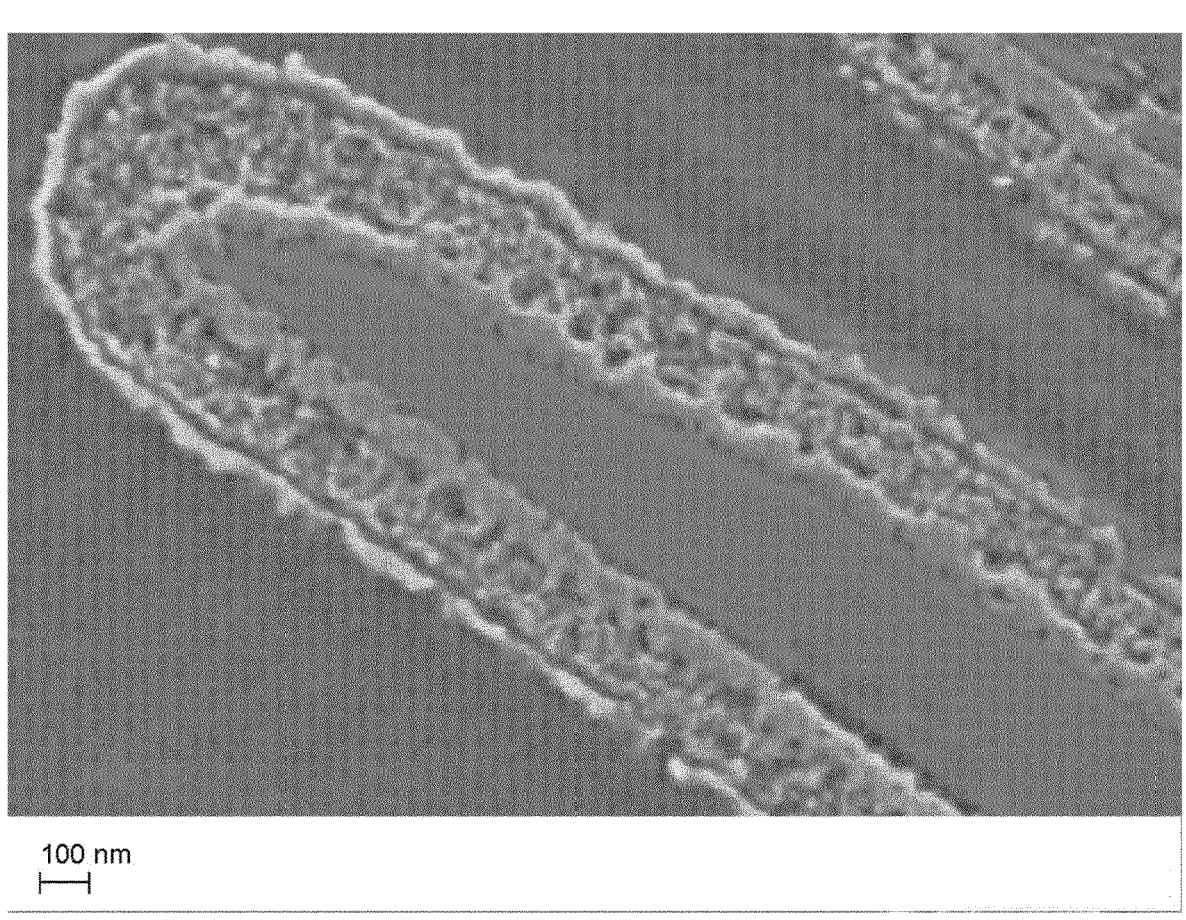

Examples of SEM-cross section micrographs at a magnification of 50,000-fold (against Polaroid 545) are depicted in FIG. 2 (example 2) and FIG. 3 (example 6). The three-layer structure (layers 2, 3, and in between spacer layer 4) can be well resolved. The spacer layer for example 2, as seen in this two-dimensional picture, has sort of a "teeth"-like morphology whilst the spacer layer of example 6 has sort of a "sponge"—like morphology. These morphologies are representative for the solvochromic effect pigments with various states in between.

In contrast, SEM pictures of comparative example 1 (FIG. 4) and of comparative example 4 (FIG. 5) are shown. In comparative example 1 the spacer layer is very clearly seen and it is striking that it has much more cavities and larger cavities than in the inventive examples. Comparative example 4, in contrast, has a very thin spacer layer only.

To more quantify these morphology differences the area distribution functions of the cavities in the spacer layers were determined for the inventive examples and those comparative examples which exhibit a spacer layer. For this purpose the micrographs were processed again with the microscope software AxioVision for all inventive examples and for comparative examples 1 to 8. At least 32 cavities were measured individually. For the inventive examples at least 120 cavities were measured. The cavities were first segmented using the software, their areas were measured and afterwards the cumulative frequency distribution was evaluated. With the quantile function of excel the $A_{50}$-values were determined and reported in Table 4.

Figure 6:
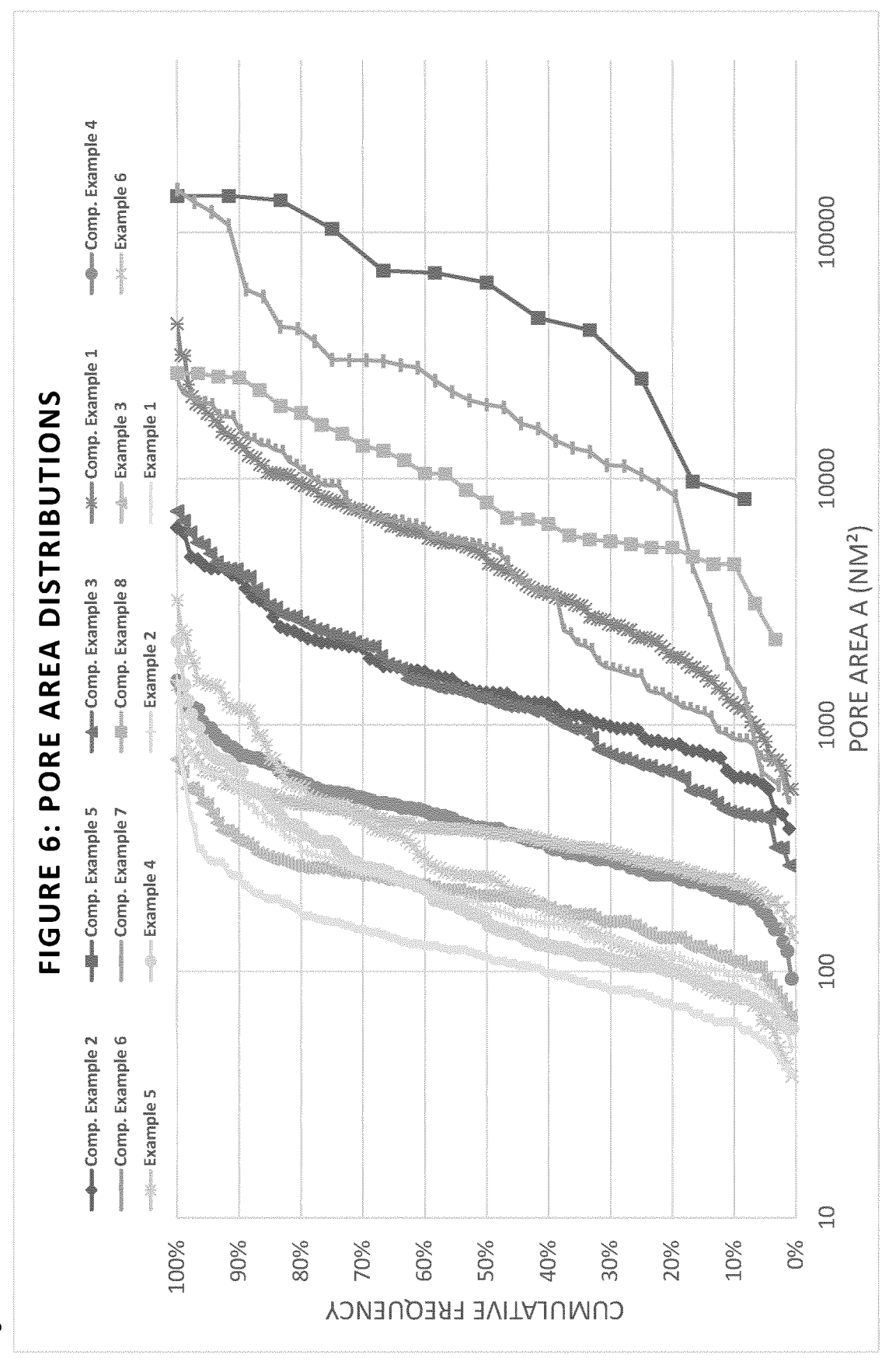

Additionally, the determined size distributions of the A-values were depicted in FIG. 6.

Clearly the $A_{50}$-values as well as the whole cavity area A distribution were much lower for all inventive examples compared to the values of the comparative examples. Only for comparative example 4 the $A_{50}$-value was close to those of inventive examples, but here the layer stack was different ($Fe_2O_3/TiO_2/Fe_2O_3$).

All inventive examples exhibit a layer stack of either $TiO_2/Fe_2O_3/TiO_2$ or of $TiO_2/ZrO_2/TiO_2$ before calcination.

It is assumed that the rather small cavity sizes lead to a high inner surface area of the connectors which is capable to evolve high capillary forces. With the help of these capillary forces the cavities may be filled with solvent. This change in the effective refractive index of this layer causes a difference in the interference color. If the solvent can evaporate it is assumed that the capillary forces are not strong enough to keep the solvent molecules in the spacer layer so that they can disappear.

Additionally, it can be seen from Table 4 that all inventive examples have a strikingly different Ti/Fe- or Ti/Zr-ratio compared to the comparative examples.

LIST OF FIGURES

FIG. 1: SEM of a cross-section of a "spacer" effect pigment from state-of-the art. Magnification: 50,000 against Polaroid 545.

FIG. 2: SEM of a cross-section of the effect pigment of example 2. Magnification: 50,000 against Polaroid 545.

FIG. 3: SEM of a cross-section of the effect pigment of example 6. Magnification: 50,000 against Polaroid 545.

Figure 4:
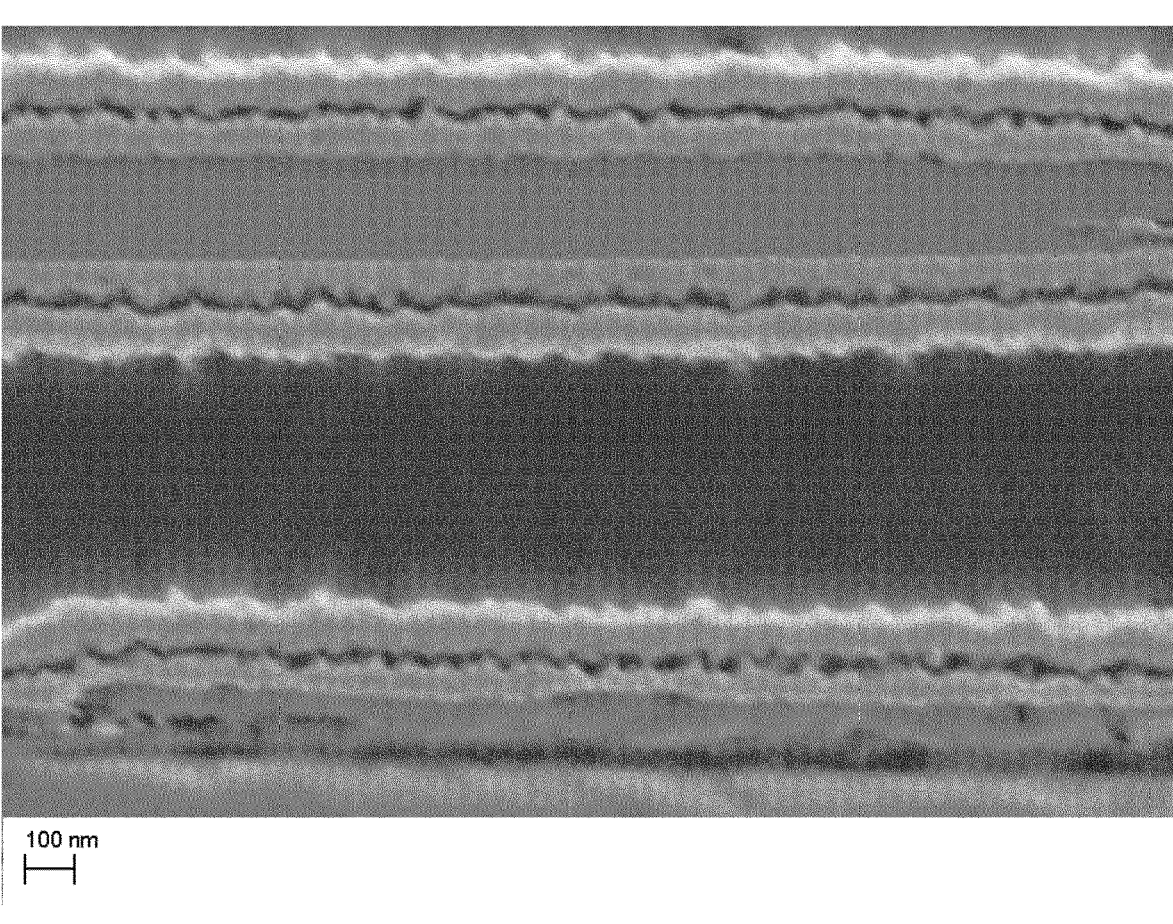

FIG. 4: SEM of a cross-section of the effect pigment of comparative example 1. Magnification: 50,000 against Polaroid 545.

Figure 5:
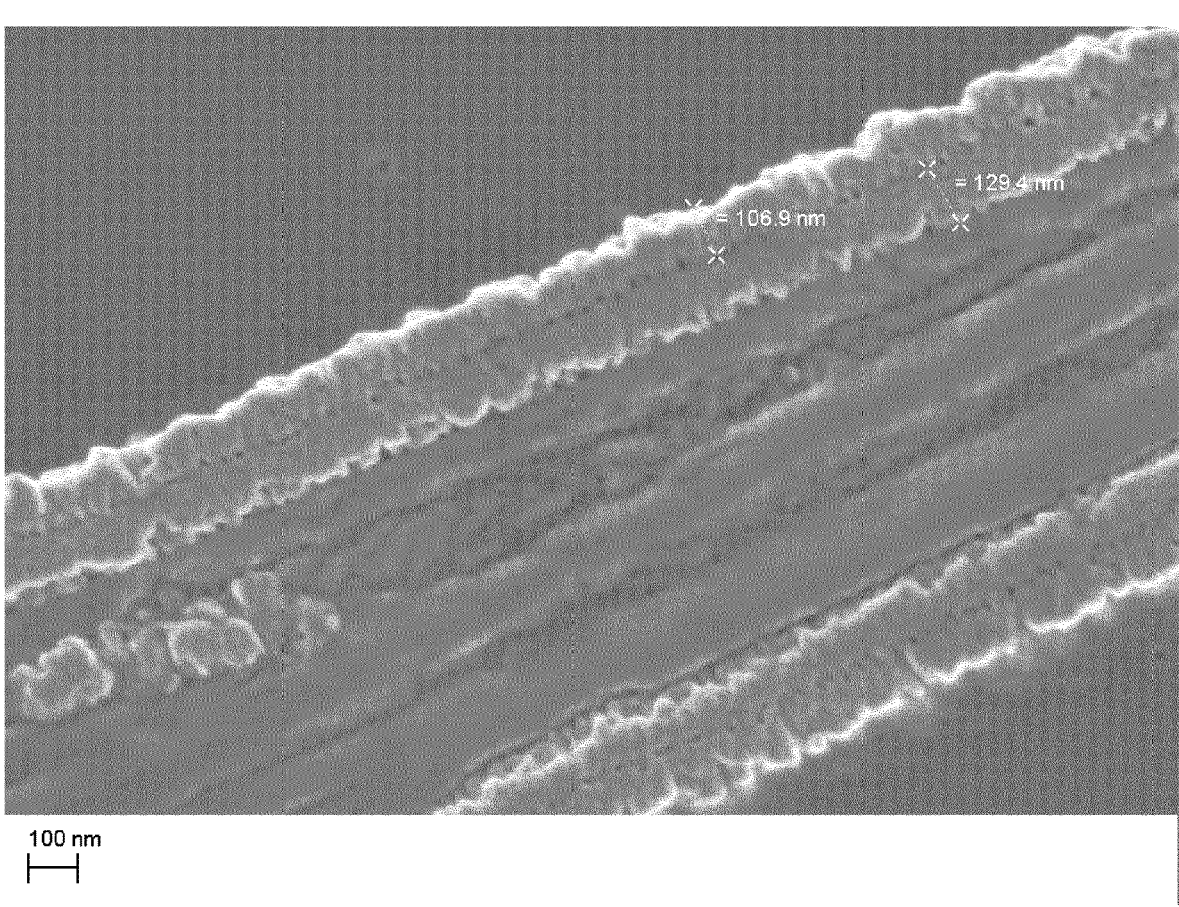

FIG. 5: SEM of a cross-section of the effect pigment of example 4. Magnification: 50,000 against Polaroid 545.

FIG. 6: Cumulative frequency distributions of the pore area distribution as determined from SEM micrographs for several examples and comparative examples.

The invention claimed is:

1. An effect pigment having solvochromic properties comprising substrates in platelet form and a coating applied to the substrates, wherein the coating comprises
   an optional layer 1 comprising at least one of tin oxide, tin hydroxide and/or tin oxide hydrate,
   a layer 2 comprising at least one of metal oxide, metal hydroxide and/or metal oxide hydrate,
   a layer 3 comprising at least one of metal oxide, metal hydroxide and/or metal oxide hydrate, wherein a majority of the metal oxide, metal hydroxide and/or metal oxide hydrate of the layers 2 and 3 comprise two different metal ions selected from Ti, Fe and Zr, and
   a spacer layer 4 located in between layers 2 and 3, wherein the layer 4 has a porous structure comprising cavities and connectors and a median area of cavity size distribution $A_{50}$ in a range of 80 to 600 $nm^2$.

2. The effect pigment having solvochromic properties according to claim 1, wherein the solvochromic properties denote to the effect pigment having a first interference color under ambient atmosphere which changes reversibly to a second interference color, when the effect pigment comes into contact with a solvent.

3. The effect pigment having solvochromic properties according to claim 1, wherein the layers 2 and 3 are mainly composed of $TiO_2$.

4. The effect pigment having solvochromic properties according to claim 1, wherein metal ions comprised in the connectors in the spacer layer 4 are mainly Fe or Zr.

5. The effect pigment having solvochromic properties according to claim 1, wherein the molar ratio of Ti to any of Fe or Zr in layers 2, 3 and 4 is in a range of 1.5 to 4.0.

6. The effect pigment having solvochromic properties according to claim 1, wherein the substrates in platelet form include any one or more of metal platelets, natural mica platelets, synthetic mica platelets, iron mica, glass platelets, $SiO_2$ platelets, $Al_2O_3$ platelets, kaolin platelets, talc platelets, and bismuth oxychloride platelets.

7. An effect pigment having solvochromic properties according to claim 1, wherein the average thicknesses of layers 2 or 3 independently are in a range of 40 to 160 nm.

8. The effect pigment having solvochromic properties according to claim 1, wherein the spacer layer 4 has a geometric thickness $h_a$ in a range of 100 to 400 nm.

9. A process for manufacturing an effect pigment having solvochromic properties comprising substrates in platelet form and a coating applied to the substrates, wherein the coating comprises
   an optional layer 1 comprising at least one of tin oxide, tin hydroxide and/or tin oxide hydrate,
   a layer 2 comprising at least one of metal oxide, metal hydroxide and/or metal oxide hydrate,
   a layer 3 comprising at least one of metal oxide, metal hydroxide and/or metal oxide hydrate, wherein a majority of the metal oxide, metal hydroxide and/or metal oxide hydrate of the layers 2 and 3 comprise two different metal ions selected from—Ti, Fe and Zr, and
   a spacer layer 4 located in between layers 2 and 3, wherein the layer 4 has a porous structure comprising cavities and connector and a median area of cavity size distribution $A_{50}$ in a range of 80 to 600 $nm^2$,
   the process comprising:
   (i) optionally applying an uncalcined layer comprising at least one of tin oxide, tin hydroxide and/or tin oxide hydrate to the substrates in platelet form,
   (ii) sequentially applying three uncalcined layers A, B and C each consisting essentially of a single metal oxide, metal hydroxide and/or metal oxide hydrate, where the layers A, B and C are arranged directly one on top of another and wherein the metal ions of layers A, B and C are selected from Ti, Fe and Zr, wherein the metal ion from layer B is different to the metal ions of layers A or C, (iii) separating the effect pigment obtained in (ii) from the liquid phase and drying the product, (iv) calcining the dried effect pigment obtained from (iii) at a temperature in a range of 300° C. to 600° C., wherein the metal ions present in layer B diffuse at least partly into layer A and/or layer C during the calcination step to form the layer 4.

10. The process for manufacturing an effect pigment having solvochromic properties as claimed in claim 9, wherein layers A and C are $TiO_2$ and layer B is $Fe_2O_3$ or $ZrO_2$.

11. The process for manufacturing an effect pigment having solvochromic properties as claimed in claim 9, wherein drying the product commences at a temperature ranging from 70° C. to 160° C.

12. The process for manufacturing an effect pigment having solvochromic properties as claimed in claim 9, wherein thicknesses of the layers A and C are independently in a range of more than 50 to 240 nm.

13. The process for manufacturing an effect pigment having solvochromic properties as claimed in claim 9, wherein a stack of the uncalcined layers A, B and C and the optional uncalcined layer comprising at least one of tin oxide, tin hydroxide and/or tin oxide hydrate does not have an additional layer adjacent to the uncalcined layer A or the optional uncalcined layer and/or the uncalcined layer C, the additional layer being composed of any metal oxide including a metal ion selected from Ti, Fe, Sn, Mn, Zr, Ca, Sr, Ba, Ni, Ag, Zn, Cu, Ce, Cr and Co.

14. An article comprising a coating which contains an effect pigment having solvochromic properties as claimed in claim 1.

15. The effect pigment having solvochromic properties according to claim 1, wherein the substrates in platelet form comprise metallic substrates coated with at least one of metal oxide, metal hydroxide and/or metal oxide hydrate.

16. The process for manufacturing an effect pigment having solvochromic properties as claimed in claim 9, wherein the substrates in platelet form are nonmetallic.

17. A bronzing composition comprising a binder and the effect pigment having solvochromic properties according to claim 1.

18. A coating application comprising a plurality of layers, a top coating of the plurality of layers comprising the effect pigment having solvochromic properties according to claim 1.

* * * * *